(12) United States Patent
Levinbook et al.

(10) Patent No.: US 10,680,870 B2
(45) Date of Patent: Jun. 9, 2020

(54) SYNTHESIS OF NEAR-CONSTANT MODULUS WAVEFORM FOR HIGH FREQUENCY TRANSMISSION

(71) Applicant: Huawei Technologies Co., Ltd., Shenzhen (CN)

(72) Inventors: Yoav Levinbook, Hod Hasharon (IL); Doron Ezri, Hod Hasharon (IL); Ezer Melzer, Hod Hasharon (IL); Zongjie Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/408,067

(22) Filed: May 9, 2019

(65) Prior Publication Data
US 2019/0268202 A1    Aug. 29, 2019

Related U.S. Application Data

(63) Continuation of application No. PCT/EP2016/077147, filed on Nov. 9, 2016.

(51) Int. Cl.
*H04L 27/26* (2006.01)
*G06F 17/14* (2006.01)
(Continued)

(52) U.S. Cl.
CPC ........ *H04L 27/2636* (2013.01); *G06F 17/141* (2013.01); *H04B 7/0413* (2013.01);
(Continued)

(58) Field of Classification Search
CPC ............. H04L 27/2636; H04L 27/2614; H04L 27/2602; H04L 27/2646; H04L 27/2631;
(Continued)

(56) References Cited

U.S. PATENT DOCUMENTS

| 7,095,290 B2 * | 8/2006 | Hakkinen | ........... H04L 27/2071 332/103 |
| 2004/0252775 A1 * | 12/2004 | Park | .................. H04L 25/03834 375/260 |

(Continued)

FOREIGN PATENT DOCUMENTS

| CN | 101785227 A | 7/2010 |
| CN | 105307260 A | 2/2016 |
| EP | 1841158 A1 | 10/2007 |

OTHER PUBLICATIONS

Ezri, "Introducing STORM-Near 0db PAPR Waveform for mmWAVE 5G", Huawei Tel-Aviv Research Center, pp. 1-23 (May 1, 2017).
(Continued)

*Primary Examiner* — Siu M Lee
(74) *Attorney, Agent, or Firm* — Leydig, Voit & Mayer, Ltd.

(57) ABSTRACT

A transmitter, comprising a processor adapted to convert a primary sequence of modulation symbols into a primary signal, using a primary pulse shape, convert an auxiliary sequence of modulation symbols, created from the primary sequence, to an auxiliary signal using an auxiliary pulse shape and create a joint output signal based on the primary signal and on the auxiliary signal.

24 Claims, 12 Drawing Sheets

(51) Int. Cl.
*H04B 7/0413* (2017.01)
*H04L 5/00* (2006.01)
*H04L 27/20* (2006.01)
*H04L 25/03* (2006.01)

(52) U.S. Cl.
CPC ........ *H04L 5/001* (2013.01); *H04L 25/03834* (2013.01); *H04L 27/2078* (2013.01); *H04L 27/2602* (2013.01); *H04L 27/2614* (2013.01); *H04L 27/2631* (2013.01); *H04L 27/2646* (2013.01); *H04L 27/2627* (2013.01)

(58) Field of Classification Search
CPC ............ H04L 27/2078; H04L 27/2627; H04L 25/03834; H04L 5/001; H04B 7/0413; G06F 17/141
See application file for complete search history.

(56) References Cited

U.S. PATENT DOCUMENTS

| | | | |
|---|---|---|---|
| 2005/0153675 A1 | 7/2005 | Yoon | |
| 2007/0140364 A1* | 6/2007 | Ouyang | H03M 13/2703 375/260 |
| 2007/0211829 A1* | 9/2007 | Liang | H04L 25/03834 375/320 |
| 2009/0052577 A1 | 2/2009 | Wang | |
| 2009/0074093 A1* | 3/2009 | Han | H04L 27/2615 375/260 |
| 2012/0076229 A1* | 3/2012 | Brobston | H04W 52/0206 375/295 |
| 2013/0170589 A1* | 7/2013 | Matero | H04L 25/06 375/343 |
| 2013/0195158 A1* | 8/2013 | Bae | H04B 7/0456 375/219 |
| 2016/0127515 A1* | 5/2016 | Kim | H04L 69/18 370/254 |
| 2018/0375707 A1* | 12/2018 | Bala | H04L 27/2627 |

OTHER PUBLICATIONS

Perahia, "TGad Evaluation Methodology", IEEE 802.11-09/0296r16, pp. 1-6, Institute of Electrical and Electronics Engineers, New York, New York (Jan. 20, 2009).

"Discussion on further PAPR reduction for uplink DFT-S-OFDM", 3GPP TSG RAN WG1 NF Ad Hoc Meeting, Spokane, USA, R1-1700077, 3rd Generation Partnership Project, Valbonne, France (Jan. 16-20, 2017).

Cariou et al.,"TGay Evaluation Methodology," IEEE P802.11 Wireless LANs, 802.11-09/0296r16, Institute of Electrical and Electronics Engineers, New York, New York (Jan. 18, 2016).

"3rd Generation Partnership Project; Technical Specification Group Radio Access Network; Evolved Universal Terrestrial Radio Access (E-UTRA); Multiplexing and channel coding (Release 13)", 3GPP TS 36.212, V13.0.0, pp. 1-121, 3rd Generation Partnership Project, Valbonne, France (Dec. 2015).

"[85-18] PA assumptions for NR; Email discussion summary", 3GPP TSG-RAN WG1#86, Gothenburg, Sweden, R1-167297, 3rd Generation Partnership Project, Valbonne, France (Aug. 22-26, 2016).

* cited by examiner

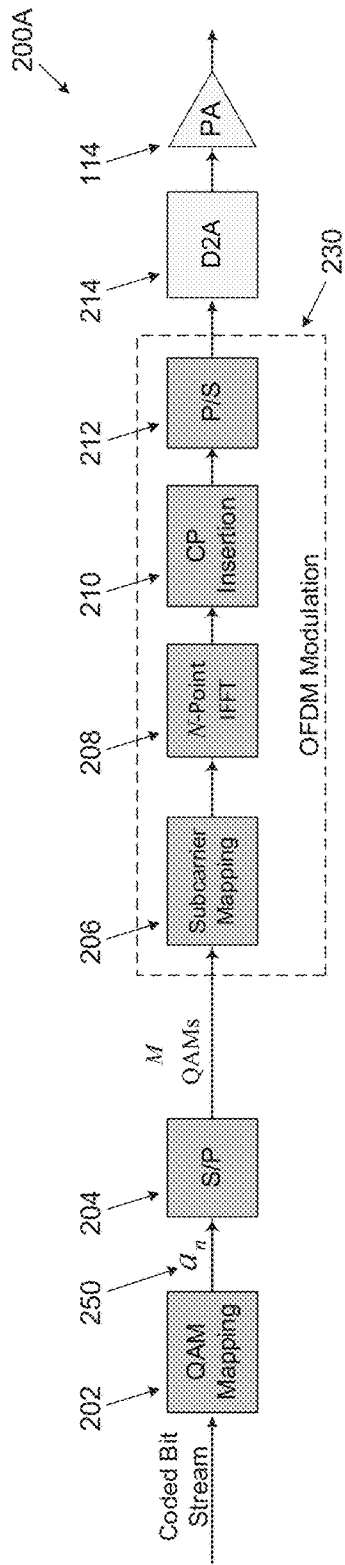
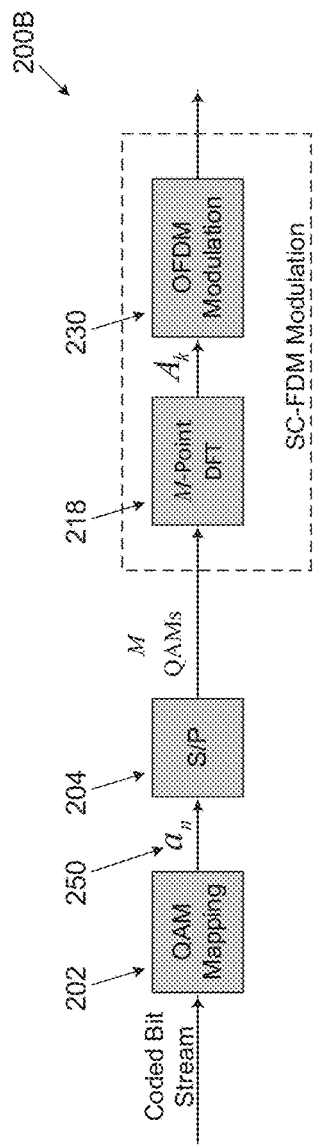
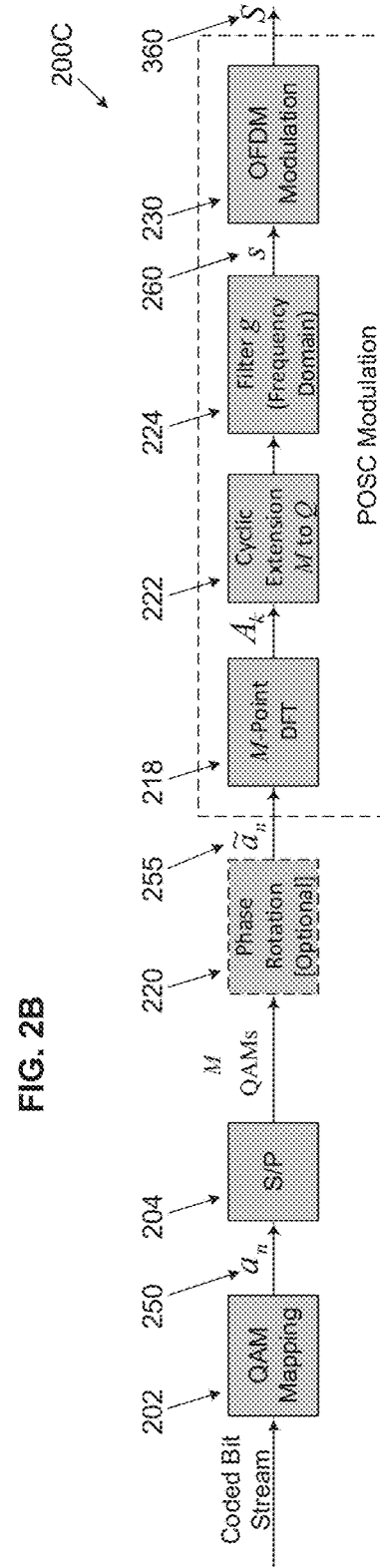
FIG. 2A
FIG. 2B
FIG. 2C

SYNTHESIS OF NEAR-CONSTANT MODULUS WAVEFORM FOR HIGH FREQUENCY TRANSMISSION

CROSS-REFERENCE TO RELATED APPLICATIONS

This application is a continuation of International Application No. PCT/EP2016/077147, filed on Nov. 9, 2016, the disclosure of which is hereby incorporated by reference in its entirety.

REFERENCES CITED

Materials incorporated by reference in this disclosure include the following:

[1] IEEE doc 802.11-09/0296r16, TGad Evaluation Methodology, January 2010 (section 3.2).
[2] IEEE doc 802.11-15/0866r2, TGay Evaluation Methodology, January 2016 (section 2.2.3).
[3] 3GPP TSG RAN WG1 email discussion "[85-18] PA assumption for NR", June 2016.
[4] 3GPP TS 36.212 V13.0.0 (2015 December), Evolved Universal Terrestrial Radio Access (E-UTRA); Multiplexing and channel coding (Release 13).

BACKGROUND

The present disclosure, in some embodiments thereof, relates to generating a high frequency (HF) signal having a low Peak to Average Power Ratio (PAPR) and, more specifically, but not exclusively, to generating a low-PAPR HF signal by complementing the signal with one or more auxiliary signals to increase constancy of the signal's amplitude.

Wireless communication, in particular cellular communication, is rapidly evolving to provide higher performance, for example, increased throughput, improved Band-Width (BW) utilization, enhanced coverage, reduced cost equipment and/or the like.

The superior behavior of Single-Carrier Frequency Division Multiplexing (SC-FDM) signals, also known as Discrete Fourier Transform spread Orthogonal Frequency Division Multiplexing (DFT-s-OFDM) signals, over OFDM in terms of performance, in particular due to having reduced PAPR, was the main motivation for adopting SC-FDM as the modulation technique for a plurality of applications, for example, the Long Term Evolution (LTE) uplink.

SUMMARY

According to an aspect of some embodiments of the present disclosure there is provided a transmitter, comprising a processor adapted to convert a primary sequence of modulation symbols into a primary signal, using a primary pulse shape, convert an auxiliary sequence of modulation symbols, created from the primary sequence, to an auxiliary signal using an auxiliary pulse shape and create a joint output signal based on the primary signal and on the auxiliary signal.

According to some embodiments of the disclosure, the processor is configured to perform at one or more of the following operations to the primary sequence, or to the auxiliary sequence, or to a compounded sequence thereof:

When the processing is in frequency domain:
  a complex phase shift by $\pi/2$ or a multiple thereof;
  a discrete Fourier transformation, DFT;
  a cyclic extension;
  a filter process with information about the primary pulse shape for the primary sequence and/or about the auxiliary pulse shape for the auxiliary sequence; and When the processing is in time domain:
  an up-sampling;
  a filter process with information about the primary pulse shape for the primary sequence and/or about the auxiliary pulse shape for the auxiliary sequence.

According to some embodiments of the disclosure, the auxiliary sequence is created from the primary sequence by generating each modulation symbol of the auxiliary sequence from a corresponding modulation symbol of the primary sequence and at least two preceding modulation symbols of the primary sequence.

Optionally, according to some embodiments of the disclosure, a plurality of finite sub-sequences of consecutive symbols of the primary sequence are cyclically extended to create a plurality of respective finite sub-sequences of consecutive symbols of the auxiliary sequence.

According to some embodiments of the disclosure, the processor is adapted for transmission of the output signal using any one of a group:
  frequency division multiplexing, FDM;
  discrete-Fourier-transform spread orthogonal FDM, DFT-s-OFDM;
  single carrier FDM, SC-FDM; and/or a transmission based on frequency division multiple access (FDMA).

According to some embodiments of the disclosure, the processor is adapted to periodically insert one or more fixed finite sequence of symbols, including a unique word, UW, into the primary sequence.

According to some embodiments of the disclosure, the processor is adapted to convert the primary sequence and the auxiliary sequence to frequency domain signals to create the output signal, wherein the resulting frequency domain output signal is converted back to time domain prior to transmission.

According to some embodiments of the disclosure, the processor is adapted to periodically insert guard intervals, GIs, into the time domain output signal. The guard intervals include one or more member of: a cyclic prefix (CP), a cyclic postfix, a zero prefix (ZP) and a zero tail (ZT).

According to some embodiments of the disclosure, the primary sequence modulation symbols map the data stream according to a Binary-Phase Shift Keying (BPSK) modulation scheme.

According to some embodiments of the disclosure, the sequence of modulation symbols of the primary sequence maps the data stream according to a higher order Phase Shift Keying (PSK) modulation scheme, in particular using a finite-memory differential mapping scheme, and the primary sequence and the auxiliary sequence further going through complex phase rotation between consecutive symbols by a fraction of it.

According to some embodiments of the disclosure, a Peak to Average Power Ratio (PAPR) of the output signal is lower than the PAPR of the primary signal.

According to some embodiments of the disclosure, a power of the auxiliary pulse shape used for converting the auxiliary signal is smaller than the power of the primary pulse shape used for converting the primary signal by at least 10 dB such that the power of the auxiliary signal is negligible with respect to the power of the primary signal.

According to some embodiments of the disclosure, the primary pulse shape and auxiliary pulse shape comply with one or more of a plurality of pulse duration constraints.

According to some embodiments of the disclosure, the processor is adapted to create the output signal to comply with one or more of a plurality of signal spectral constraints.

According to some embodiments of the disclosure, the primary pulse shape and the auxiliary pulse shape are constructed using an ancestor function.

According to some embodiments of the disclosure, the auxiliary pulse shape is based on the primary pulse shape.

According to some embodiments of the disclosure, the processor is adapted to perform the superposition in the frequency domain after separately converting the primary sequence and the auxiliary sequence into the frequency domain.

According to some embodiments of the disclosure, the processor is adapted to join the primary signal and the auxiliary signal through a first partial join in the time domain of the respective primary and auxiliary sequences and a second partial join in the frequency domain.

According to some embodiments of the disclosure, the output signal is transmitted simultaneously as a plurality of partial output signals through a plurality of power amplifiers to support a multi input multi output, MIMO, transmission.

According to some embodiments of the disclosure, the output signal is transmitted simultaneously as a plurality of partial output signals through a plurality of power amplifiers divided to a plurality of subsets.

According to some embodiments of the disclosure, the processor is adapted to create one or more demodulation reference signal similarly to the output signal in order to allow one or more receivers to demodulate the received output signal in order to extract the transmitted data.

According to an aspect of some embodiments of the present disclosure there is provided a receiver, comprising a processor adapted to demodulate an input signal received from a transmitter, the input signal is created based on a primary signal and an auxiliary signal, wherein the primary signal and the auxiliary signal are created by converting a primary sequence and an auxiliary sequence of modulation symbols respectively.

According to some embodiments of the disclosure, the processor is adapted to disregard the auxiliary signal when demodulating the input signal since the power of the auxiliary signal is significantly smaller than the power of the primary signal.

According to some embodiments of the disclosure, the processor is adapted to use one or more demodulation reference signal to demodulate the input signal.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings:

FIG. 2A is a block diagram of an exemplary process for creating an OFDM signal;

FIG. 2B is a block diagram of an exemplary process comprising a DFT for creating a SC-FDM, also known as DFT-s-OFDM, signal;

FIG. 2C is a block diagram of an exemplary process for creating a PAPR-Optimized SC-FDM (POSC) signal;

DETAILED DESCRIPTION

Figure 1:
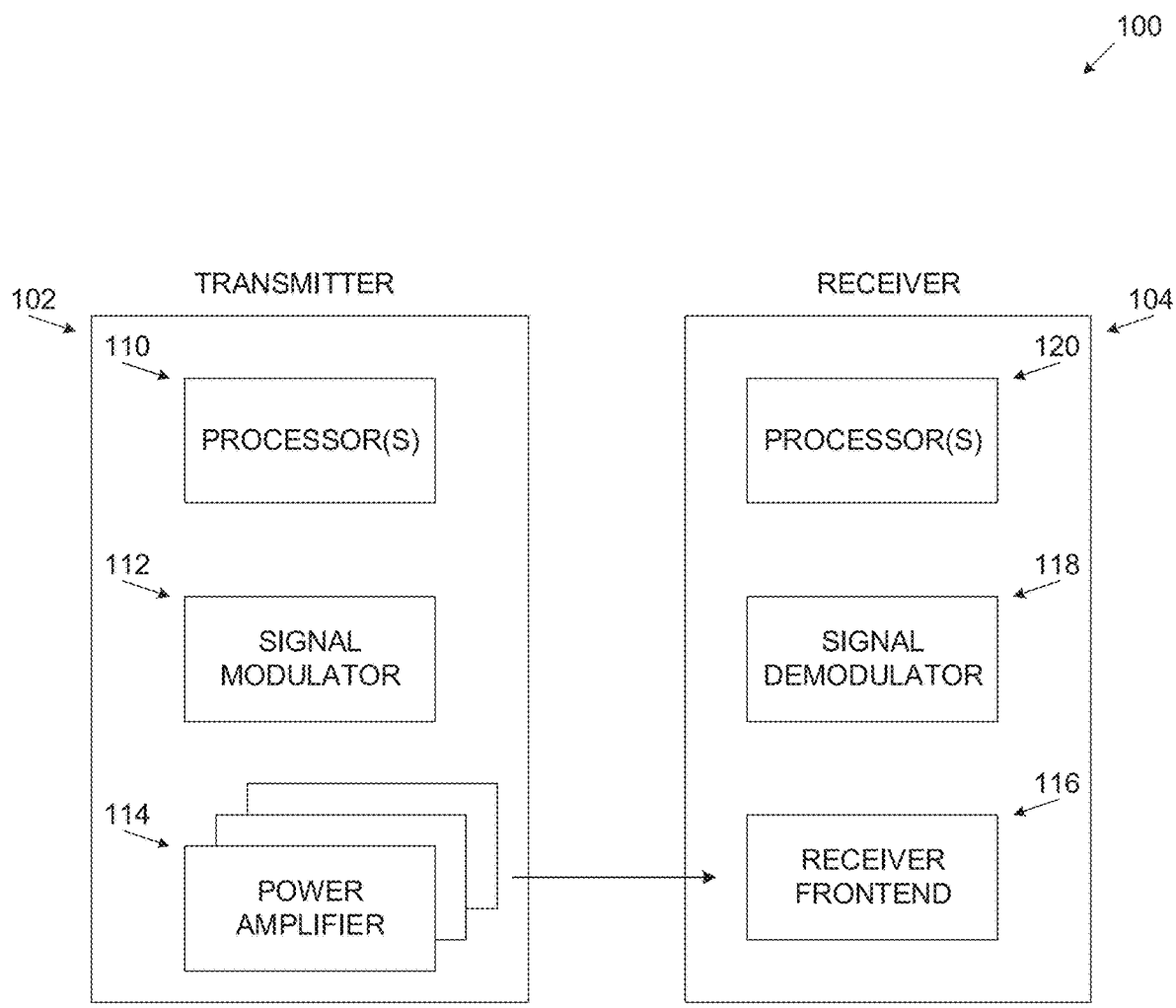
FIG. 1 is a schematic illustration of an exemplary system for reducing PAPR of an HF signal by complementing the signal with one or more auxiliary signals to increase constancy of the signal's amplitude, according to some embodiments of the present disclosure.

The present disclosure, in some embodiments thereof, relates to generating a low-PAPR HF signal and, more specifically, but not exclusively, to generating a low-PAPR HF signal by complementing the signal with one or more auxiliary signals to increase constancy of the signal's amplitude.

The present disclosure presents devices, systems and methods for generating SynThesis Of a neaR-constant Modulus (STORM) signals exhibiting high amplitude constancy and hence reduced PAPR. The STORM technique may be applied for generating wireless transmission signals compliant with one or more of a plurality of modulation, multiplexing and multiple access (MA) schemes, for example, a Frequency Division Multiplexing (FDM), a Discrete Fourier Transform spread Orthogonal FDM (DFT-s-OFDM), a Single Carrier FDM (SC-FDM), a transmission based on Frequency Division Multiple Access (FDMA) and/or the like utilizing a High Frequency (HF) band, for example, above 6 GHz. The STORM technique may be further applied for generating Single Carrier (SC) signals. The STORM technique is based on generating one or more auxiliary signals that are created from a primary signal carrying a (to be) transmitted data stream. The primary signal is combined with the auxiliary signal(s) that complement the primary signal, where the auxiliary signal(s) rectifies the nonzero PAPR of the primary signal to form the STORM signal having increased amplitude constancy and thus reduced PAPR. In order to efficiently complement each other, the primary and auxiliary signals are generated using carefully selected and/or constructed primary and auxiliary pulse shapes, respectively. Power of the auxiliary pulse shape(s) is significantly smaller than the power of the primary pulse shape, implying that the power of the auxiliary signal is significantly lower than the power of the primary signal.

To further increase the amplitude constancy of the STORM signal, auxiliary sequences of modulation symbols from which the auxiliary signal(s) are generated comprise modulation symbols which depend on a plurality of respective modulation symbols of a primary sequence from which the primary signal is generated. The primary sequence modulation symbols maps a (to be) transmitted data bit stream in one or more of a plurality of modulation schemes, for example, Binary Phase-shift Keying (BPSK), Quadrature Phase-shift Keying (QPSK), 8 Phase-shift Keying (8PSK) and/or the like.

The STORM technique may present multiple advantages compared to currently existing systems and/or methods used for reducing the PAPR of wireless transmission signals.

One of the main problems involved with wireless transmission signals, in particular for OFDM signals, SC-FDM signals, SC signals and/or the like is their relatively high PAPR. The high PAPR implies that the maximum (peak) amplitude may be significantly higher than the mean amplitude of the transmitted signal. The high PAPR forces the transmitted signals to be significantly attenuated before being fed into a non-linear Power Amplifier (PA) of a wireless transmitter. The attenuation is required in order to ensure that the (non-linear) PA is operating in its (near-optimal) operational region and to prevent the PA from entering its saturation region when the amplitude of the (to be) transmitted signal at the PA input is relatively high, thus limiting an undesirable distortion of the transmitted signal. This means that the entire amplitude scale of the transmitted signal may be reduced, due to the required attenuation, such that the maximal amplitude is still within the operational region of the PA. This attenuation is referred to as Input power Back-Off (IBO), resulting in an Output power Back-Off (OBO) of the PA. It is naturally desired to reduce the OBO as much as possible in order to achieve increased gain for the transmitted signal for one or more reasons, for example, increase communication link coverage range, enabling usage of lower efficiency PAs (i.e. cheaper PAs) in the transmitting equipment and/or the like, while still maintaining spectral containment of the transmitted signal.

To mitigate the PAPR problem of various waveforms, including and particularly OFDM-based waveforms, some of the currently existing methods may apply one or more add-ons to the transmitter (at different digital-baseband processing stages), for example, clipping or companding and filtering (CAF), Tone Reservation (TR), Tone Insertion/Injection (TI), Peak Cancellation, Selective Mapping (SLM), Partial Transmit Sequences (PTS) and Active Constellation Extension (ACE). Some of the currently existing methods may further employ Weighted OverLap & Add (WOLA) and/or filtering (i.e. filtered-OFDM) on the concatenated sequence of OFDM symbols to improve the spectral properties of the overall signal. Although occasionally having only a marginal impact on the PAPR, such processing may allow further reduction in the OBO, which is of particular interest when the transmitted signal should comply with strict requirements on the In-Band Emission (IBE) and/or Out-Of-Band Emission (OOBE), including a constraint defined, for example, in terms of a Spectral Emission Mask (SEM).

The existing PAPR reduction techniques, present some disadvantages due to tradeoffs between one or more characteristics of the transmitted signal, for example:

An explicit Spectral Efficiency (SE) loss implied by decreasing the number of data-carrying subcarriers and/or an implicit SE loss due to unavoidable detection losses of the modified waveform of the signal.

A distortion of the transmitted signal which cannot be compensated at the receiver, thus causing undesired OOBE and/or IBE, the latter being measured in terms of Error Vector Magnitude (EVM).

An Increased complexity in the design and/or production of the transmitting and/or receiving equipment that may translate to, for example, increased costs, increased power consumption, reduced battery life and/or the like.

Another approach used by the existing techniques of PAPR reduction of OFDM-based waveforms is to perform a DFT precoding (or spreading) of the modulated Quadrature Amplitude Modulation symbols (QAMs) to process their sequence in the frequency domain before mapping it onto the Inverse Fast Fourier Transform (IFFT) input of the OFDM modulator. This may allow taking advantage of the Frequency Domain Equalization (FDE) of the OFDM signal at the receiver while reducing the PAPR of the signal to be transmitted. However, the filters used in the frequency domain processing at the transmitter may be typically constrained to satisfy the Nyquist criterion in order to avoid introduction of Inter-Symbol Interference (ISI) between the QAMs within each OFDM symbol.

Application of the STORM technique to SC-FDM-based waveforms may significantly reduce the PAPR of the transmitted signal, thus reducing the OBO of the PA. Consequently, the STORM technique presents a plurality of additional advantages, for example:

The STORM implementation is based on the SC-FDM modulator with minor modifications hence presenting insignificant complexity increase to the transmitter.

Using specially crafted pulse shapes for generating the STORM signal allows compliance with requirements of SEM, Adjacent-Carrier Leakage Ratio (ACLR) and EVM.

Since the power of the auxiliary signal is significantly smaller than the power of the primary signal, for example, by 17 dB, a receiver receiving the STORM signal may process the STORM signal while ignoring the auxiliary signal, which may be implemented with a small complexity increase relative to a standard SC-FDM receiver.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer such as the user equipment (UE), as a stand-alone software package, partly on the user's computer and partly on a remote computer such as the network apparatus or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a schematic illustration of an exemplary system for reducing PAPR of an HF signal by complementing the signal with one or more auxiliary signals to increase constancy of the signal's amplitude, according to some embodiments of the present disclosure. An exemplary system 100 includes a transmitter 102 transmitting to a receiver 104 a wireless HF signal compliant with one of a plurality of radio access physical layer specifications, for example, based on FDM, DFT-s-OFDM, SC-FDM, FDMA and/or the like in one of a plurality of frequency bands, for example, between 6-100 GHz. The HF signal may be utilized for one or more of a plurality of cellular communication applications, for example, a cellular uplink (UL), a cellular downlink (DL), and/or the like. The HF signal may be further utilized for one or more of a plurality of general wireless applications, for example, a Wireless Local area Network (WLAN) such as, for example, Wi-Fi and/or the like. Typically, but not exclusively, the HF signal is utilized for uplink such that the transmitter 102 may be integrated in an endpoint device, for example, a cellular user equipment (UE), a WLAN node and/or the like, while the receiver 104 may typically, but not exclusively, be integrated in a network infrastructure apparatus, for example, a node B, an evolved Node B (eNB), a Base Station (BS) and/or a WLAN Access Point (AP). However, as discussed before, since in some applications the HF may be utilized for downlink and/or general wireless transmission, the transmitter 102 and/or the receiver 104 may be integrated in any one or more network apparatuses of the network to be used at either end (uplink, downlink, sidelink, general transmission and/or the like) of the network.

The transmitter 102 comprises a processor(s) 110 for collecting (receiving) the (to be) transmitted data and generating the transmitted output signal, a signal modulator 112 for modulating the output signal and one or more Power Amplifiers (PA) 114 for transmitting the output signal. The signal modulator 112 may be integrated with the processor(s) 110 such that the processor(s) 110 performs the signal modulation. The processor(s) 110 may include one or more processors (homogenous or heterogeneous), which may be arranged for parallel processing, as clusters and/or as one or more multi core processing units. The processor(s) 110 may include one or more co-processors, support hardware processing units, function specific processors and/or the like. For example, the processor(s) 110 may include a Digital Signals Processor (DSP), a communication processor, a hardware signal processing Integrated circuit (IC) and/or the like for creating, modulating and/or adjusting the output signal. The processor(s) 110 may execute one or more software modules for creating, modulating and/or adjusting the output signal. Each of the software module(s) comprises a plurality of program instructions that may be executed by the processor(s) 110 from one or more persistent and/or volatile memory devices, for example, a Read Only Memory (ROM), a Random Access Memory (RAM), a Flash array, a memory card and/or the like. Since typically, the transmitter 102 is integrated in the end devices that in many application may be a mobile device, the PA(s) 114 are typically smaller, cheaper and more power saving oriented.

The receiver 104 comprises a receiver 116 for receiving the output signal from the transmitter 102, a signal demodulator 118 for demodulating the output signal and a processor 120 such as the processor(s) 110 for extracting, reconstructing and/or processing the data received in the output signal. The signal demodulator 118 may be integrated with the processor(s) 120 such that the processor(s) 120 performs the signal demodulation. The processor(s) 120 execute one or more software modules and/or may use one or more of the co-processors, the support hardware processing units, the function specific processors and/or the like for extracting, reconstructing and/or processing the data received in the output signal.

The transmitter 102 and receiver 104 may contain additional components and modules whose roles are irrelevant for the current presentation and are therefore not shown in FIG. 1 for reasons of clarity.

Before further explaining the methods and processes for generating the STORM signal, some general terms, concepts, methods and/or processes for creating OFDM-based signals and/or SC(-FDM)-based signals as known in the art are first described.

Reference is now made to FIG. 2A, which is a block diagram of an exemplary process for creating an OFDM signal. A process 200A may be executed by a processor such as the processor(s) 110 of a transmitter such as the transmitter 102 transmitting an output signal to a receiver such as the receiver 104 in a system such as the system 100. The processor(s) 110 receives a coded bit stream that is to be transmitted and applies Quadrature Amplitude Modulation (QAM) mapping 202 to map the coded bit stream to a sequence of modulation symbols $\{a_n\}$ 250. The processor(s) 110 may create the sequence $\{a_n\}$ 250 using a plurality of modulation schemes, for example, BPSK, QPSK and/or the like. The processor(s) 110 may apply a serial to parallel (S/P) conversion 204 to the sequence $\{a_n\}$ 250 to produce M QAM symbols arranged in parallel to allow further processing in the processor(s) 110. The processor(s) 110 performs subcarrier mapping 206 to map the symbols of the sequence $\{a_n\}$ 250 to a plurality of subcarriers according to the specification of the OFDM signal applied in the system 100. The processor(s) 110 applies an N-Point Inverse Fast Fourier Transform (IFFT) 208 to convert the sequence to the time domain and inserts a Cyclic Prefix (CP) 210 guard interval between the resulting OFDM symbols in order to reduce the ISI in the generated signal. The guard intervals may include for example, a cyclic prefix (CP), a cyclic postfix, a zero prefix (ZP), a zero tail (ZT) and/or the like. The processor(s) 110 applies a parallel to serial (P/S) conversion 212 to the resulting stream of samples at the output of CP insertion 210 to produce a serial output data stream. The subcarrier mapping 206, the IFFT 208, the CP insertion 210 and the P/S conversion 212 are designated herein after as OFDM modulation 230. The processor(s) 110 then drives the serial output stream of samples to a digital to analog converter (D2A) 214 that converts the output sample stream to an analog signal that is fed to one or more power amplifiers such as the PA 114 for transmission. Other optional operations, such as WOLA (e.g. between the CP insertion 210 and the P/S conversion 212) and/or time domain filtering (e.g. between the P/S conversion 212 and the D2A conversion 214), are omitted from FIG. 2A for clarity. The generated OFDM signal may be represented as a complex function of time as expressed in equation 1 below (applicable for a time interval containing a single OFDM symbol).

$$S_{OFDM}(t) = \sum_{n=0}^{M-1} a_n e^{j2\pi k(n)t/T}, \quad -T_g < t \leq T \qquad \text{Equation 1}$$

where $j=\sqrt{-1}$, M<N, T is the (raw) OFDM symbol duration (resulting in a frequency spacing of $$\frac{1}{T} = \Delta f$$

between consecutive subcarriers), $T_g$ is the duration of the CP guard interval, and k(n) is the subcarrier index ($0 \leq k(n) < N$) to which the $n^{th}$ QAM symbol is mapped.

Since the PAPR of the waveform of the generic OFDM signal is typically high, in order to reduce distortions (in-band and/or out-of-band), the gain of the PA(s) 114 may be significantly reduced to prevent the PA(s) 114 from operating in the saturation region, thus leading to a high Output power Back-Off (OBO) at the PA(s) 114. A plurality of techniques are known in the art to overcome the problem by reducing the PAPR of the OFDM signal while benefiting from the Frequency Domain Equalization (FDE) advantage of the OFDM scheme. One of these techniques comprises performing a Discrete Fourier Transform (DFT) precoding (or spreading) of the sequence $\{a_n\}$ 250 (modulated QAMs) before mapping the sequence $\{a_n\}$ 250 onto the IFFT 208 as part of the OFDM modulation 230.

Reference is also made to FIG. 2B, which is a block diagram of an exemplary process comprising a DFT for creating an OFDM-based signal, specifically DFT-s-OFDM (or SC-FDM) signal. A process 200B may be executed by the processor(s) 110 of the transmitter 102 transmitting an output signal to the receiver 104 in the system 100. The process 200B is similar to the process 200A (including the D2A 214 and the PA(s) 114), with the addition that prior to applying the OFDM modulation the processor(s) 110 applies an M-Point DFT 218 to the sequence $\{a_n\}$ 250, after S/P 204, to create a Frequency Domain (FD) sequence of symbols $\{A_k\}$, thus forming an SC-FDM modulation scheme 200B. The size M of the DFT 218 is set to be sufficiently smaller than the size N of the IFFT 208. The resulting output signal as expressed in equation 2 below is referred to as DFT-s-OFDM, or Single-Carrier FDM (SC-FDM), as it is essentially an interpolated SC signal up to the CP insertion.

$$S_{SCFDM}(t) = \sum_{n=0}^{M-1} a_n \Phi\left(t - \frac{T}{M}n\right), \quad -T_g < t \leq T \qquad \text{Equation 2}$$

where $$\Phi(t) = \sum_{k=0}^{M-1} e^{j\frac{2\pi}{T}kt}$$

( = Dirichlet kernel, or "periodic *sinc*")

To ensure the interpolative nature of the combined operation of DFT 218 followed by the IFFT 208, thus ensuring reduced PAPR of the resulting signal, the bin-mapping operation of the M outputs from the DFT 218 must be equal-spaced, e.g., perform the subcarrier mapping 206 onto M contiguous subcarriers during the OFDM modulation 230.

In order to further reduce the PAPR and consequently reduce the OBO of the PA(s) 114, one or more additional techniques, methods and/or processes may be applied to the process 200A (for creating the OFDM signal) and/or the process 200B (for creating the SC-FDM signal) as known in the art. These additional methods may include, for example, complex phase rotation between consecutive QAM symbols, for example, rotation of $$\frac{\pi}{2}$$

for BPSK and/or $$\frac{\pi}{4}$$

for other modulation schemes. The additional methods may also include, for example, creating a PAPR Optimized SC-FDM (POSC) in which some tradeoff is made to sacrifice (increase) some BW to achieve reduced PAPR.

Reference is also made to FIG. 2C, which is a block diagram of an exemplary process for creating a POSC signal. A process 200C may be executed by the processor(s) 110 of the transmitter 102 transmitting an output signal to the receiver 104 in the system 100. The process 200C adds some additional steps to the process 200B, in particular, an optional phase rotation 220 and a POSC modulation process comprising the SC-FDM modulation 232 with the addition of a cyclic extension 222 and a FD filter g 224. Naturally the process 200C comprises the D2A 214 and the PA(s) 114 (even though not present in FIG. 2C). In case the phase rotation 220 is applied to the sequence {$a_n$} 250 the resulting phase rotated sequence $\tilde{a}_n$ 255 is injected to the DFT 218 to create an FD sequence {$A_k$}. The processor(s) 110 applies the spectral shaping filter g 224, for example, using FD PAPR Reduction Filter (PRF) taps $g_k$ to create a pulse shape applied to the FD sequence {$A_k$} for generating an FD POSC signal s 260. The taps $g_k$ of the filter g 224 are typically constrained to satisfy the Nyquist zero-ISI criterion, for example, a Root-Raised Cosine (RRC) filter tap applied to create the FD POSC signal s 260 in order to prevent ISI between the M QAMs of the sequence {$a_n$} 250. The processor(s) 110 applies the OFDM modulator to the FD POSC signal s 260 to convert the signal back to the time domain (TD) and create a TD POSC output signal S 360 ($S_{POSC}$) as expressed in equation 3 below.

$$S_{POSC}(t) = \sum_{n=0}^{M-1} a_n \phi_g\left(t - \frac{T}{M}n\right), -T_g < t \leq T \quad \text{Equation 3}$$

where $$\phi_g(t) = \sum_{k=0}^{Q-1} g_k e^{j\frac{2\pi}{T}kt}$$

( = POSC pulse shape)

where $\phi_g(t)$ is a pulse shape in TD generated by applying the FD PRF $g_k$ to create the waveform of the POSC signal.

As a special case of POSC, when QAM mapping 202 in FIG. 2C degenerates into Pulse Amplitude Modulation (PAM) mapping and $$\frac{\pi}{2}$$

phase rotation 220 is performed, the resulting POSC signal is referred to as Offset-QAM (OQAM) POSC, OQPSK-POSC being a particular example.

According to some embodiments of the present disclosure the PAPR is reduced for a signal such as the POSC signal by creating a STORM signal comprising a primary POSC signal carrying the (to be) transmitted data that is combined with one or more auxiliary POSC signals, such that the joint output signal has an amplitude with increased constancy and hence with significantly reduced PAPR.

The following description for the STORM signal generation demonstrates BPSK ($a_n \in \{\pm 1\}$) mapping for QAM mapping of the sequence {$a_n$} 250, however the described STORM signal implementation may be extended to higher order modulation schemes such as QPSK, 8PSK and the like.

Figure 3A:
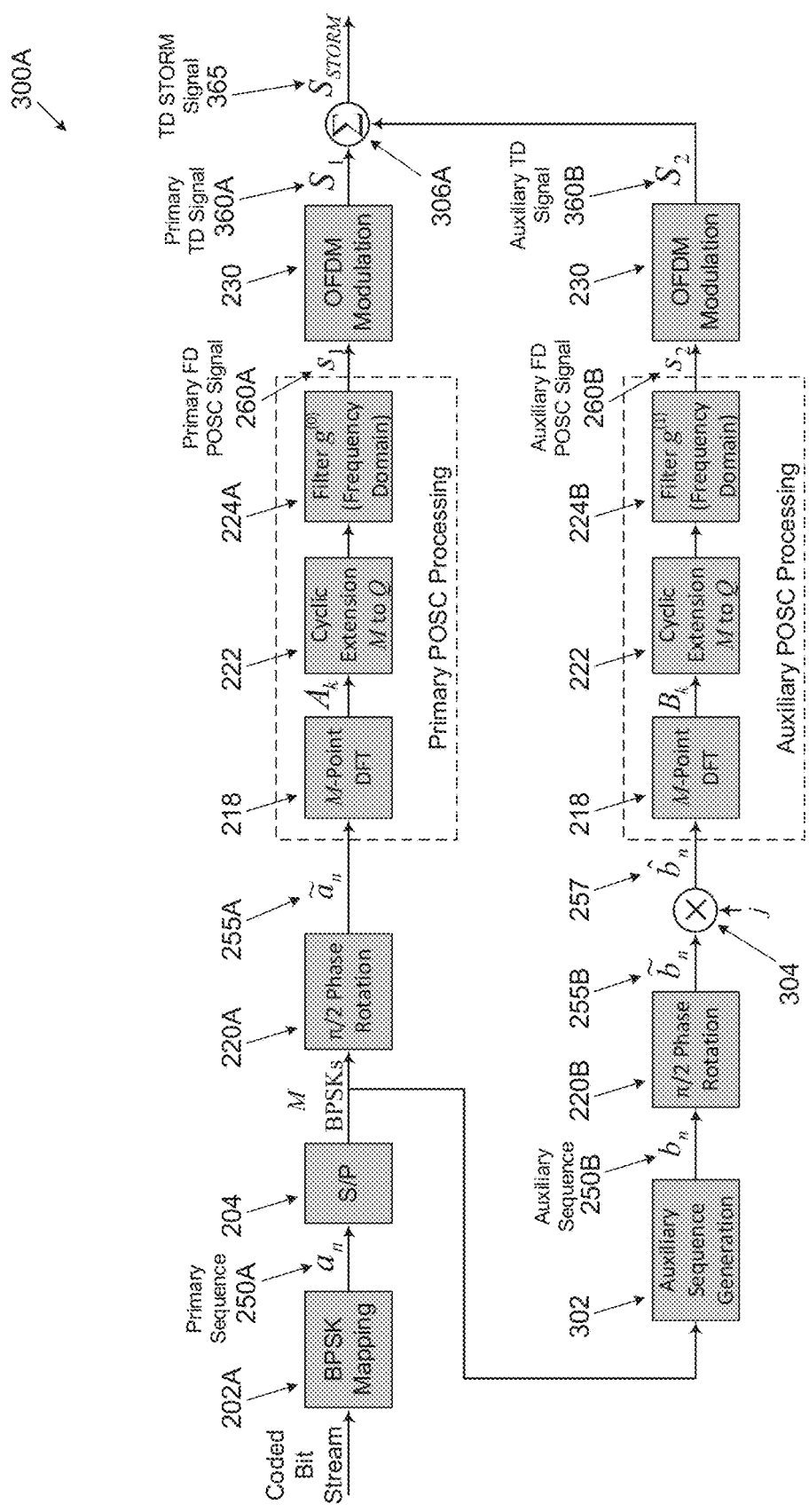
FIG. 3A is a block diagram of an exemplary process of a first embodiment for creating a SynThesis Of a neaR-constant Modulus (STORM) signal, according to some embodiments of the present disclosure.

Reference is now made to FIG. 3A, which is a block diagram of an exemplary process of a first embodiment for creating a STORM signal, according to some embodiments of the present disclosure. An exemplary process 300A may be executed by a processor such as the processor(s) 110 of a transmitter such as the transmitter 102 transmitting an output signal to a receiver such as the receiver 104 in a system such as the system 100. The process 300A may be applied for generating a STORM signal compliant with one or more of a plurality of radio access physical layer specifications, for example, based on FDM, DFT-s-OFDM, SC-FDM, FDMA and/or the like. The process 300A extends a POSC process such as the process 200C and is applied to a primary sequence {$a_n$} 250A such as the sequence of modulation symbols {$a_n$} 250 mapping coded data, and an auxiliary sequence of modulation symbols {$b_n$} 250B created from the primary sequence {$a_n$} 250A. The extended POSC process is applied to the primary sequence {$a_n$} 250A to generate a primary FD POSC signal $s_1$ 260A such as the FD POSC signal s 260, and to the auxiliary sequence {$b_n$} 250B to generate an auxiliary FD POSC signal $s_2$ 260B such as the FD POSC signal s 260. While the process 300A may be applied to constellations of high order, the process 300A is presented for BPSK modulation hence the primary sequence {$a_n$} 250A is created by the processor(s) 110 applying a BPSK mapping 202A to the input coded bit stream.

The processor(s) 110 may apply an auxiliary sequence generation 302 to the primary sequence {$a_n$} 250A in order to create the auxiliary sequence {$b_n$} 250B. The auxiliary sequence generation 302 may be based on creating each of the modulation symbols ($b_m$, m=0, 1, . . . , M−1) of the auxiliary sequence {$b_n$} 250B depending on a series of respective modulation symbols of the primary sequence {$a_n$} 250A, for example, 3 consecutive symbols such as, for example, $b_m$ (where 2≤m<M) is created from the current primary symbol $a_m$ and two previous modulation symbols ($a_{m-1}$ and $a_{m-2}$) as expressed in equation 4 below. For creating the initial two symbols $b_0$ and $b_1$, the processor(s) 110 may cyclically extend a plurality of finite sub-sequences of M consecutive symbols of the primary sequence {$a_n$} 250A to create a plurality of respective finite sub-sequences of consecutive symbols of the auxiliary sequence. This may allow creating $b_0$ from $a_0$, $a_{M-1}$, and $a_{M-2}$ and creating $b_1$ from $a_1$, $a_0$, and $a_{M-1}$ in the example under consideration. The resulting cyclic extension procedure is expressed by the modulus operator (mod M) in the equation 4, which formulates the generation of the auxiliary sequence $\{b_n\}$ from the primary sequence $\{a_n\}$.

$$b_m = -a_m a_{(m-1) \bmod M} a_{(m-2) \bmod M}, \quad m=0,1,\ldots,M-1 \quad \text{Equation 4:}$$

The processor(s) 110 applies to both the primary sequence $\{a_n\}$ 250A and the auxiliary sequence $\{b_n\}$ 250B the phase rotation 220, which for the process 300A may be $$\frac{\pi}{2}$$

phase rotations 220A and 220B, respectively, as BPSK is used for mapping the primary sequence $\{a_n\}$ 250A. The outcome of the phase rotations 220A and 220B are a phase rotated primary sequence $\{\tilde{a}_n\}$ 255A and a phase rotated auxiliary sequence $\{\tilde{b}_n\}$ 255B, respectively, that are driven to their respective DFT modules 218 to create an FD primary sequence $\{A_k\}$ and an FD auxiliary sequence $\{B_k\}$, respectively.

The processor(s) 110 may apply an additional phase shift 304 to apply an additional overall relative phase shift of $$\frac{\pi}{2}$$

(namely a relative factor of j) to the modulation symbols of the rotated auxiliary sequence $\{\tilde{b}_n\}$ 255B to create a shifted auxiliary sequence $\{\hat{b}_n\}$ 257 that is driven into the respective DFT 218.

The primary FD POSC signal $s_1$ 260A is generated by the processor(s) 110 through a primary POSC modulation process applied to the primary sequence $\{a_n\}$ 250A using a pulse shape $\phi(t)$ constructed using a FD filter $g^{(0)}$ 224A. The auxiliary FD POSC signal $s_2$ 260B is generated by the processor(s) 110 through an auxiliary POSC modulation process applied to the auxiliary sequence $\{b_n\}$ 250B using a pulse shape $\varphi(t)$ constructed using a FD filter $g^{(1)}$ 224B. Selection and construction of the pulse shapes $\phi(t)$ and $\varphi(t)$ is described herein after.

The pulse shapes $\phi(t)$ and $\varphi(t)$ are assumed to decay fast enough away from 0, within a time interval shorter than $\frac{1}{2}T_g$. The frequency domain representation of the pulses may be given by the Fourier coefficients $g_k^{(0)}$ and $g_k^{(1)}$ satisfying (to a relative high accuracy) the relations expressed in equation 5 below.

$$\phi(t) = \sum_{k=0}^{Q-1} g_k^{(0)} e^{j\frac{2\pi}{T}kt}, \quad \text{Equation 5}$$

$$\varphi(t) = \sum_{k=0}^{Q-1} g_k^{(1)} e^{j\frac{2\pi}{T}kt}$$

The gain of the pulse shape $\varphi(t)$ used by the processor(s) 110 to create the auxiliary POSC signal is significantly smaller, i.e. by at least 10 dB, than the gain of the pulse shape $\phi(t)$ used by the processor(s) 110 to create the primary POSC signal. This naturally results in the auxiliary FD POSC signal $s_2$ 260B having power that is significantly smaller than the power of the primary FD POSC signal $s_1$ 260A, and similarly the auxiliary TD POSC signal $S_2$ 360B having power that is significantly smaller than the power of the TD POSC signal $S_1$ 360A.

The processor(s) 110 applies an OFDM modulation such as the OFDM modulation 230 to convert each of the primary FD POSC signal $s_1$ 260A and the auxiliary FD POSC signal $s_2$ to the time domain, creating a primary TD $S_1$ POSC signal 360A and an auxiliary TD POSC signal $S_2$ 360B. The processor(s) 110 may combine (join), for example, through a summation operation (superposition) 306A the primary TD POSC signal $S_1$ 360A and the auxiliary TD POSC signal $S_2$ 360B to create a TD STORM output signal $S_{STORM}$ 365. The processor(s) 110 drives the TD STORM output signal $S_{STORM}$ 365 to a D2A such as the D2A 214 to create an analog signal that is fed to one or more PAs such as the PA 114 to be transmitted to the receiver 104.

The resulting STORM time domain output signal $S_{STORM}$ 365 is expressed in equation 6 below.

$$S_{STORM}(t) = \sum_{n=0}^{M-1} j^n a_n \phi\left(t - \frac{T}{M}n\right) + j\sum_{n=0}^{M-1} j^n b_n \varphi\left(t - \frac{T}{M}n\right), \quad \text{Equation 6}$$

$$-T_g < t \leq T$$

The first and second summands in the equation 6 represent the primary POSC signal and the auxiliary POSC signal, respectively (represented in FD by $s_1$ 260A and $s_2$ 260B in the process 300A). Here M is selected to be an integer multiple of 4.

Using the expressions of the phase rotated primary sequence $\{\tilde{a}_n\}$ 255A and the shifted auxiliary sequence $\{\hat{b}_n\}$ 257, the equations 4 and 6 may be re-written as expressed in equations 7 and 8 respectively.

$$s_{STORM}(t) = \sum_{n=0}^{M-1} \tilde{a}_n \phi\left(t - \frac{T}{M}n\right) + \sum_{n=0}^{M-1} \hat{b}_n \varphi\left(t - \frac{T}{M}n\right), \quad \text{Equation 7}$$

$$-T_g < t \leq T$$

$$\hat{b}_m = \tilde{a}_m \tilde{a}^*_{(m-1) \bmod M} \tilde{a}_{(m-2) \bmod M} = \tilde{a}_m \frac{\tilde{a}_{(m-2) \bmod M}}{\tilde{a}_{(m-1) \bmod M}}, \quad \text{Equation 8}$$

$$m = 0, 1, \ldots, M-1$$

By generating the symbols of the auxiliary sequence $\{b_n\}$ 250B as dependent on several respective symbols of the primary sequence $\{a_n\}$ 250A and selecting appropriate pulse shapes $\phi(t)$ and $\varphi(t)$ for generating the primary POSC signal and the auxiliary POSC signal, respectively, the primary POSC signal and the auxiliary POSC signal (represented in FD by $s_1$ 260A and $s_2$ 260B and in TD by $S_1$ 360A and $S_2$ 360B, respectively, in the process 300A) may complement each other such that when summed together the amplitude constancy of the joined STORM output signal $S_{STORM}$ 365 may be significantly increased, thus reducing its PAPR.

In order to be able to detect the transmitted signal at the receiver 104, where the signal is received after passing through an unknown channel, the transmitter 102 may transmit a Demodulation Reference Signal (DMRS), carrying predefined (known to both transmitter 102 and receiver 104) pilot symbols, in addition to the data carrying signal. The DMRS may be used at the receiver 104 for Channel Estimation (CE) purposes. In order to maintain the low PAPR property throughout the transmission of the output signal, including the DMRS, the DMRS symbols may also be created using the process 300A with insertion of one or more predefined symbols into the primary sequence $\{a_n\}$ 250A. For example, in an OFDM and/or SC-FDM signal, one or more DMRS symbols may be inserted over one middle OFDM symbol every X OFDM symbols in a slot of consecutive OFDM symbols (for instance X=7 or 6) to create a STORM output signal such as the STORM output signal $S_{STORM}$ 365 containing the DMRS in addition to the (to be) transmitted data. This may serve to avoid and/or reduce performance deterioration through undesirable degradations in CE quality. In channels with a low delay spread, that may be typical for HF transmission, the CE losses in the detection of the generated STORM output signal $S_{STORM}$ 365 may be negligible (~0.2 dB).

On the receiver side, a receiver frontend such as the receiver frontend 116 of receiver 104 converts the received signal into a STORM output baseband signal ($S_{STORM}$, up to some additional noise and/or distortion), and transfers it to a signal demodulator such as the signal demodulator 118, typically integrated with the processor(s) 120 of the receiver 104. The processor(s) 120 demodulates the received STORM baseband signal to extract the encoded data. Since the main contribution to the power of the STORM output signal $S_{STORM}$ 365 originates from the primary TD POSC signal $S_1$ 360A (the power of the primary TD POSC signal $S_1$ 360A being significantly larger than the power of the auxiliary TD POSC signal $S_2$ 360B), the processor(s) 120 may disregard the contribution of the auxiliary POSC signal to the STORM signal and process the received STORM signal as it was a plain POSC signal. The processor(s) 120 may use the DMRS symbols embedded in the STORM output signal $S_{STORM}$ 365 to demodulate the received STORM signal.

Optionally, the process 300A for generating the STORM output signal $S_{STORM}$ 365 is modified with one or more modifications, for example, adding, removing, adapting and/or unifying one or more steps of the process 300A.

Figure 3B:
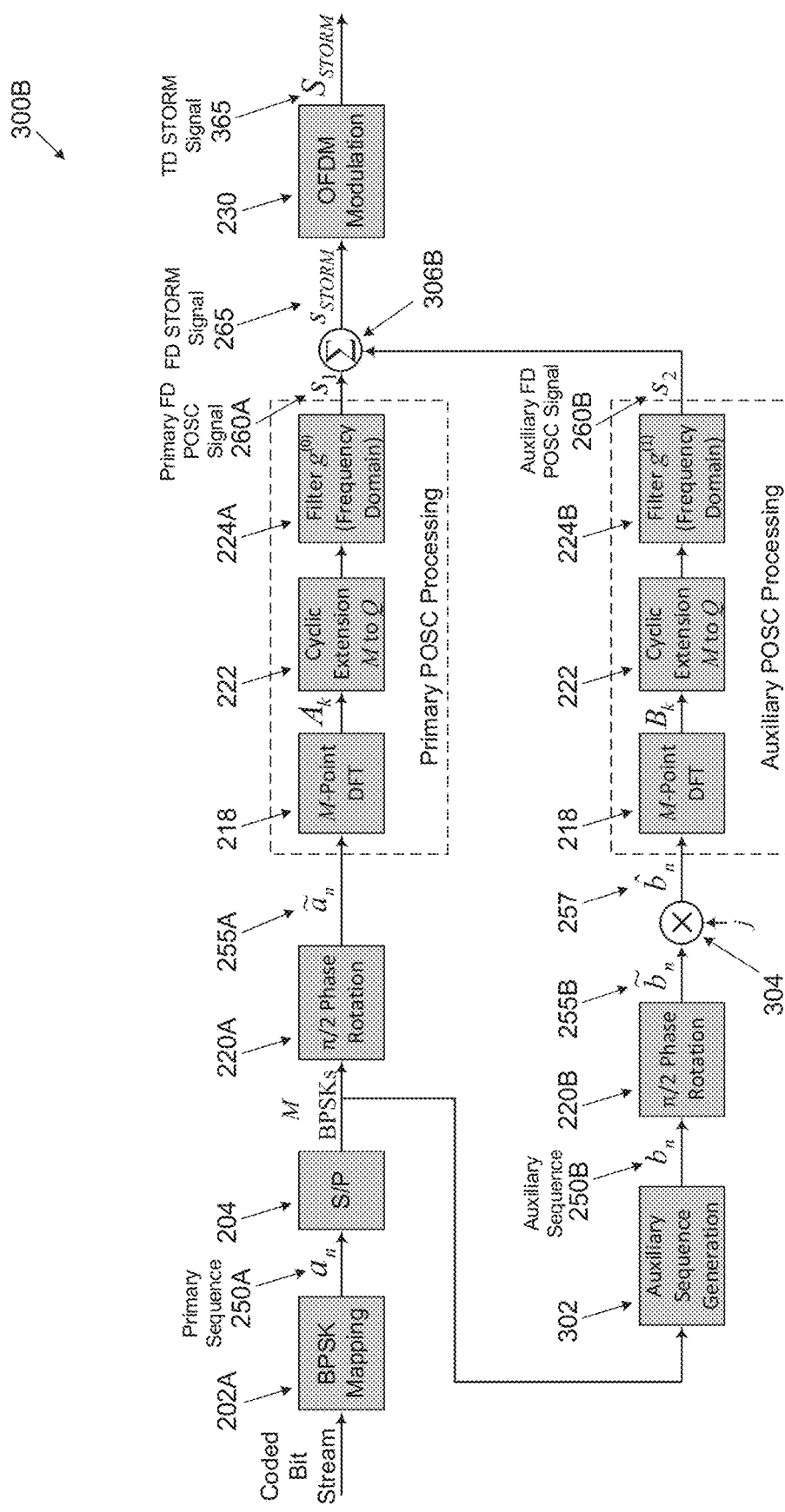
FIG. 3B is a block diagram of an exemplary process of a second embodiment for creating a STORM signal, according to some embodiments of the present disclosure.

Reference is also made to FIG. 3B, which is a block diagram of an exemplary process of a second embodiment for creating a STORM signal, according to some embodiments of the present disclosure. An exemplary process 300B may be executed by the processor(s) 110 of the transmitter 102 transmitting an output signal to the receiver 104 in the system 100. The process 300B follows the flow of the process 300A with the exception that combining (joining) the primary POSC signal and the auxiliary POSC signal is done in the frequency domain before applying the OFDM modulation 230. The process 300B follows the same flow as the process 300A up to the point where the primary FD POSC signal $s_1$ 260A and the auxiliary FD POSC signal $s_2$ are generated each through its POSC processing pipe. At that point, the processor(s) 110 may combine (join), for example, through a summation operation (superposition) 306B the primary FD POSC signal $s_1$ 260A and the auxiliary FD POSC signal $s_2$ 260B to create an FD STORM output signal $S_{STORM}$ 265. The FD STORM output signal $S_{STORM}$ 265 is driven to the OFDM modulator 230 generating the TD STORM output signal $S_{STORM}$ 365 that is driven to the D2A 214 to create an analog signal fed to one or more of the PAs 114 to be transmitted to the receiver 104.

Figure 3C:
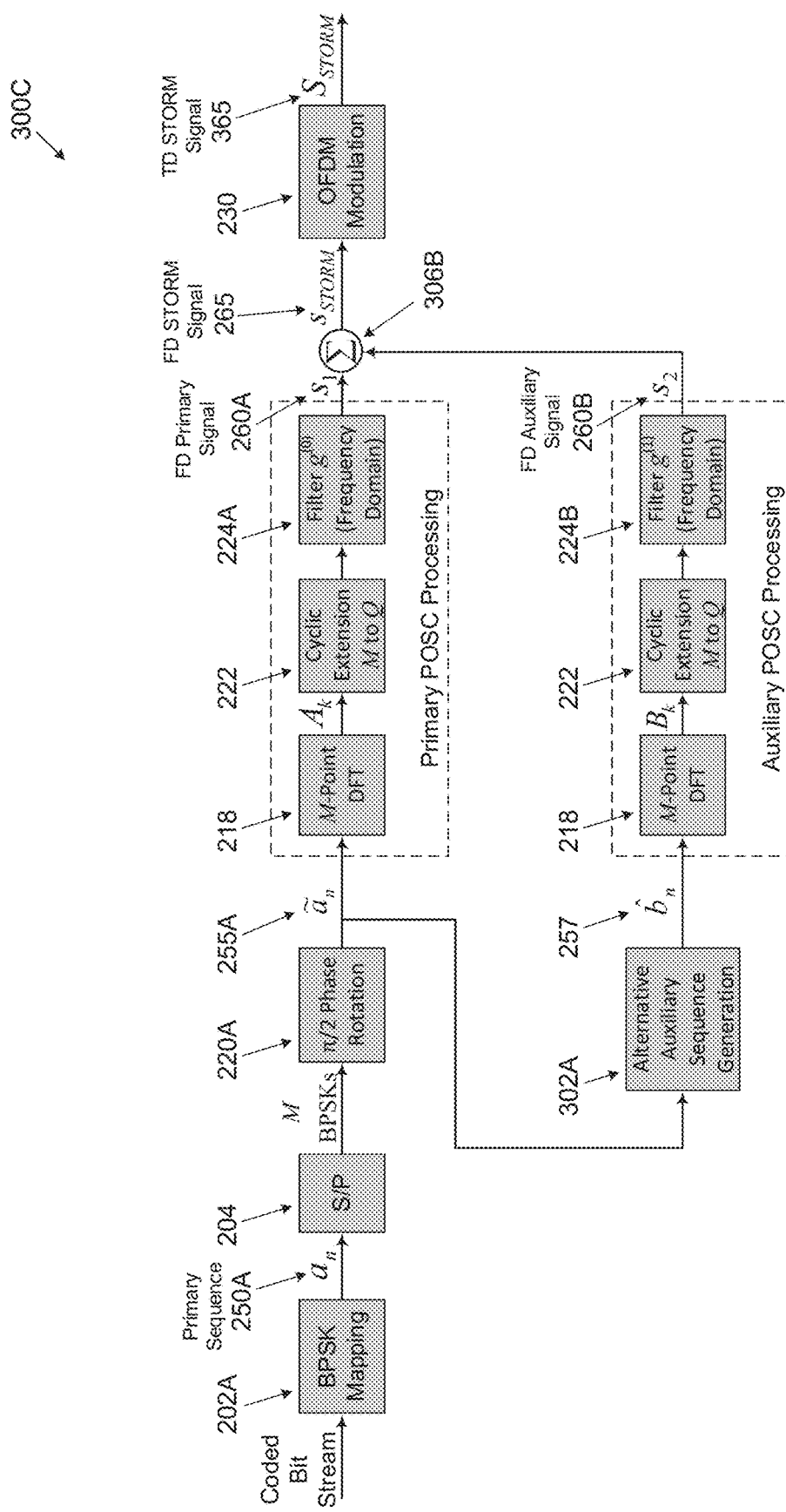
FIG. 3C is a block diagram of an exemplary process of a third embodiment for creating a STORM signal, according to some embodiments of the present disclosure.

Reference is also made to FIG. 3C, which is a block diagram of an exemplary process of a third embodiment for creating a STORM signal, according to some embodiments of the present disclosure. An exemplary process 300C may be executed by the processor(s) 110 of the transmitter 102 transmitting an output signal to the receiver 104 in the system 100. The process 300C follows the same steps and operations of the process 300B with the exception that the processor(s) 110 applies the alternative auxiliary sequence generation 302A after rotating the primary sequence $\{a_n\}$ 250A, thus implementing the mathematical operation expressed in equation 8 instead of the one in equation 4 implemented by the auxiliary sequence generation 302. The processor(s) 110 therefore applies an alternative auxiliary sequence generation 302A to the phase rotated primary sequence $\{\tilde{a}_n\}$ 255A to create directly the phase shifted auxiliary sequence $\{\hat{b}_n\}$ 257 in the process 300C.

Figure 3D:
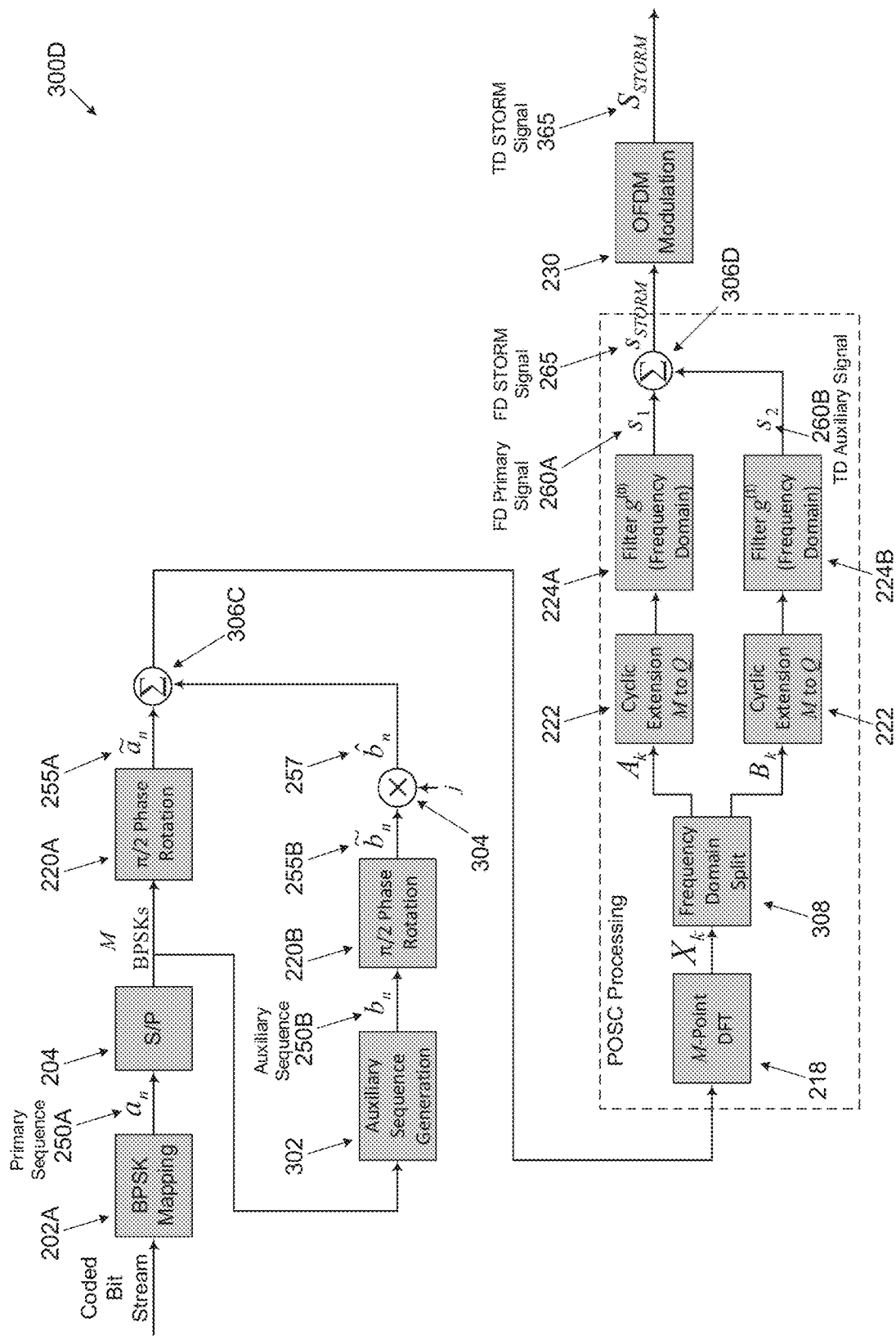
FIG. 3D is a block diagram of an exemplary process of a fourth embodiment for creating a STORM signal, according to some embodiments of the present disclosure.

Reference is also made to FIG. 3D, which is a block diagram of an exemplary process of a fourth embodiment for creating a STORM signal, according to some embodiments of the present disclosure. An exemplary process 300D may be executed the processor(s) 110 of the transmitter 102 transmitting an output signal to the receiver 104 in the system 100. The process 300D follows the same steps and operations of the process 300B with some exception, in particular applying a single DFT 218 in the process of generation the FD STORM output signal $S_{STORM}$ 265. After processor(s) 110 applies the phase rotations 220A and 220B to the primary sequence $\{a_n\}$ 250A and the auxiliary sequence $\{b_n\}$ 250B, respectively, and after applying the additional phase shift 304 to the rotated auxiliary sequence $\{\tilde{b}_n\}$, the processor(s) 110 performs a first partial join operation 306C, for example, a summation operation (superposition) to join the phase rotated primary sequence $\{\tilde{a}_n\}$ 255A and the shifted auxiliary sequence $\{\hat{b}_n\}$ 257, and feeds the joined sequence to a single DFT such as the DFT 218 to create a FD joint sequence $\{X_k\}$. Since the shifted auxiliary sequence $\{\hat{b}_n\}$ 257 has an overall relative $$\frac{\pi}{2}$$

phase factor compared to the sequence $\{\tilde{a}_n\}$ 255A, the processor(s) 110 may apply a frequency domain split 308 to easily separate the FD joined sequence $\{X_k\}$ to the FD primary sequence $\{A_k\}$ and the FD auxiliary sequence $\{B_k\}$. The frequency domain split 308 may be implemented to derive the FD primary sequence $\{A_k\}$ and the FD auxiliary sequence $\{B_k\}$ from the FD joined sequence $\{X_k\}$ by using, for example, the formulas expressed in equation 9 below.

$$A_k = \frac{X_k + X^*_{(M/2-k) \bmod M}}{2}, \qquad \text{Equation 9}$$

$$B_k = \frac{X_k + X^*_{(M/2-k) \bmod M}}{2},$$

$$k = 0, 1, \ldots, M -$$

After splitting the FD joined sequence $\{X_k\}$, the process 300D proceeds as the process 300B to create the primary FD POSC signal $s_1$ 260A and the auxiliary FD POSC signal $s_2$ 260B using the pulse shapes $\phi(t)$ and $\varphi(t)$, respectively, constructed with the respective FD filters, filter $g^{(0)}$ 224A and filter $g^{(1)}$ 224B. The processor(s) 110 may apply a second partial join operation 306D, for example, a summation operation (superposition), the primary FD POSC signal $s_1$ 260A and the auxiliary FD POSC signal $s_2$ 260B in order to create the FD STORM output signal $S_{STORM}$ 265. The single DFT implementation in the process 300D may lead to a more efficient (lower complexity) algorithm for generating the STORM output signal $S_{STORM}$ 365 which in turn may lead to reduced design complexity, reduced computation resources, reduced production complexity and thus to reduced costs and/or power consumption.

Naturally, one or more of the modifications applied to the process 300A, 300B, 300C and/or 300D may be combined together to further reduce complexity, computing resources and/or cost of the process for generating the STORM output signal $S_{STORM}$ 365.

According to some embodiments of the present disclosure, the concept of generating the STORM output signal by joining a primary signal and an auxiliary signal complementing each other to increase amplitude constancy of the output signal, thus reducing its PAPR, may be applied to SC (non-FDM) signals processed in the time domain with a time domain implementation of the signals' waveform construction.

Figure 4:
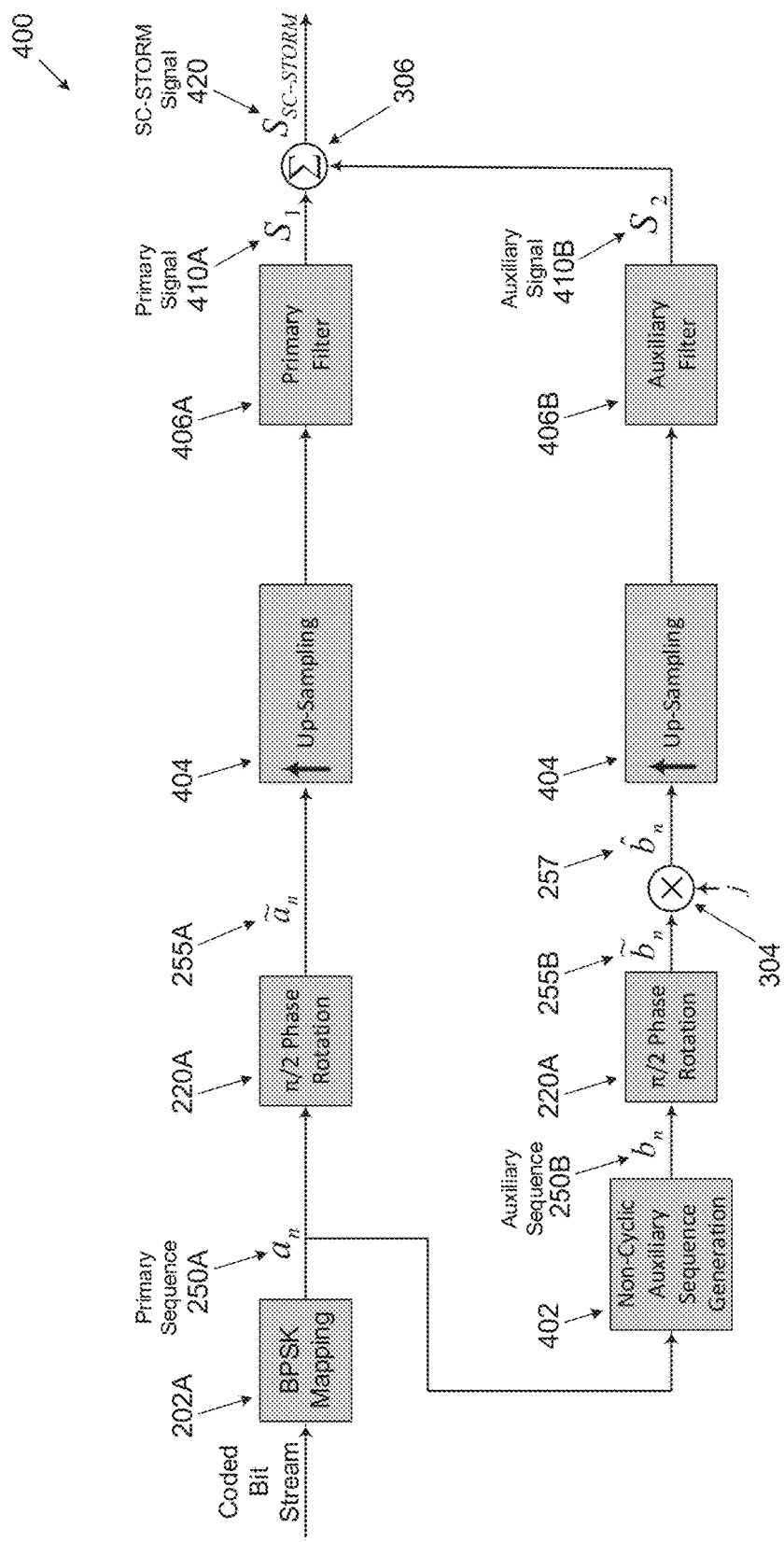
FIG. 4 is a block diagram of an exemplary process for creating a Single Carrier (SC) STORM signal, according to some embodiments of the present disclosure.

Reference is now made to FIG. 4, which is a block diagram of an exemplary process for creating an SC-STORM signal, according to some embodiments of the present disclosure. An exemplary process 400 may be executed a processor such as the processor(s) 110 of a transmitter such as the transmitter 102 transmitting an output signal to a receiver such as the receiver 104 in a system such as the system 100. The process 400 extends a standard SC generation process with the addition of an auxiliary sequence generation 402, a phase rotation and possible additional phase rotation (shift) to a generated auxiliary sequence and applying pulse shaping constructed with respective filters to a primary sequence and an auxiliary sequence joined together to create an SC-STORM output signal.

While the process 400 may be applied to constellations of high order, the process 400 is presented for BPSK modulation hence the primary sequence $\{a_n\}$ 250A is created by the processor(s) 110 applying a BPSK mapping 202A to the input coded bit stream. The processor(s) 110 may generate an auxiliary sequence $\{b_n\}$ 250B by applying auxiliary sequence generation 402 to the primary sequence $\{a_n\}$ 250A. While the auxiliary sequence generation 402 applies the same design concept of the auxiliary sequence generation 302 presented for the process 300B, the auxiliary sequence generation 402 may be somewhat adjusted since no S/P is applied to the SC signal and hence a cyclic extension of sub-sequences of the primary sequence may not be mandatory. The auxiliary sequence generation 402 may generate the auxiliary sequence $\{b_n\}$ 250B by applying a formula as expressed in equation 10 below (slightly modified compared to the equation 4). The equation 10 is relevant for a very long primary sequence of symbols $\{a_n\}$, with $a_{-1}$ and $a_{-2}$ being set to some arbitrary initial values taken from the set $\{\pm1\}$, without affecting the essence of this embodiment.

$$b_m = -a_m a_{m-1} a_{m-2}, \ m=0,1,2,\ldots \qquad \text{Equation 10:}$$

Similarly to what is done in the process 300A, the processor(s) 110 applies to both the primary sequence $\{a_n\}$ 250A and the auxiliary sequence $\{b_n\}$ 250B phase rotation such as the phase rotation 220, for example, a $$\frac{\pi}{2}$$

phase rotation 220A as BPSK is used for mapping the primary sequence $\{a_n\}$ 250A. The outcome of the phase rotation 220A is a phase rotated primary sequence $\{\tilde{a}_n\}$ 255A and a phase rotated auxiliary sequence $\{\tilde{b}_n\}$ 255B. The processor(s) 110 may apply an additional phase shift such as the additional phase shift 304 to apply an additional relative overall phase shift (expressed by the multiplicative factor j) to the modulation symbols of the rotated auxiliary sequence $\{\tilde{b}_n\}$ 255B to create a shifted auxiliary sequence $\{\hat{b}_n\}$ 257.

Similarly to the equation 8, the symbols of the phase rotated primary sequence $\{\tilde{a}_n\}$ 255A may be used to formulate the shifted auxiliary sequence $\{\hat{b}_n\}$ 257 as expressed in equation 11 below (slightly modified compared to the equation 8). In the equation 8, $\tilde{a}_{-1}$ and $\tilde{a}_{-2}$ can be set to arbitrary initial values from the set $\{\pm1, \pm j\}$, yet satisfying the constraint $\text{Re}(\tilde{a}_{-1}\tilde{a}_{-2})=0$, without affecting the essence of this embodiment.

$$\hat{b}_m = \tilde{a}_m \tilde{a}_{m-2}/\tilde{a}_m, \ m=0,1,2,\ldots \qquad \text{Equation 11:}$$

The processor(s) 110 applies up-sampling 404 to the phase rotated primary sequence $\{\tilde{a}_n\}$ 255A and the shifted auxiliary sequence $\{\hat{b}_n\}$ 257 before applying pulse shaping onto them, using pulse shapes constructed using a primary filter 406A and an auxiliary filter 406B, respectively, to generate a primary signal $S_1$ 410A and an auxiliary signal $S_2$ 410B. Performing the filtering operations 406A and 406B at a higher sampling rate, after up-sampling, is required in order to achieve a desirable accuracy for the selected pulse shapes, which inherently increase the processed signals BW. The up-sampling factor is determined according to some tradeoff between accuracy and/or complexity and/or spectral efficiency. The processor(s) 110 then combines, for example, through summation 306 the primary signal $S_1$ 410A and an auxiliary signal $S_2$ 410B to generate an SC-STORM output signal $S_{SC-STORM}$ 420.

The resulting SC-STORM output signal $S_{SC-STORM}$ 420 may be expressed by a non-cyclic variant of the expression in equation 6, with no insertion of a guard interval of a CP type, i.e. $T_g=0$, and hence with no WOLA (CP windowing) processing between consecutive OFDM symbols. The SC-STORM output signal $S_{SC-STORM}$ 420 may be formally expressed through equation 12 below.

$$S_{SC-STORM}(t) = \sum_{n=-\infty}^{\infty} j^n a_n \phi(t-n\tilde{T}) + j \sum_{n=-\infty}^{\infty} j^n b_n \varphi(t-n\tilde{T}) \qquad \text{Equation 12}$$

where for a given t, each one of the two sums in the equation 12 practically spans over finite ranges of n due to the practically short duration of the pulses $\phi$ and $\varphi$. The pulse-shaped waveforms may be constructed in (discrete) time domain using the primary filter 406A and the auxiliary filter 406B utilizing digital filters whose coefficients $\Phi_m = \phi(mT_s + \delta_\phi)$, m=0, 1, ..., $M_\phi - 1$ and m=$\varphi(mT_s + \delta_\varphi)$, m=0, 1, ..., $M_\varphi - 1$ may be some sampled (at rate $$f_s = \frac{1}{T_s}$$

versions of $\phi(t)$ and $\varphi(t)$, respectively.

The process 400 may be applied for generating the SC-STORM output signal $S_{SC-STORM}$ 420 created from a primary sequence such as the primary sequence $\{a_n\}$ 250A in which fixed sub-sequences of BPSK symbols are embedded, for example, pilot symbols and/or the like. In particular, the process 400 may be applied to a primary sequence such as the primary sequence $\{a_n\}$ 250A embedded with a prefixed contiguous sequence of U symbols cyclically inserted within each block $A^{(l)} = \{a_n\}_{n=(l-1)M}^{lM-1}$ of the primary sequence $\{a_n\}$ 250A with each block comprising M symbols, for example, the PHY SC specification IEEE 802.11ad, section 21.6.3.2.5, where M≡0 (mod 4) and U<M, for instance U=64, M=512, and l is the (integer) block index. This means that the sub-sequence $\{a_{(l-1)M}, a_{(l-1)M+1}, \ldots, a_{(l-1)M+U_1-1}, a_{lM-U_2}, a_{lM-U_2+1}, \ldots, a_{lM-1}\}$ is a (fixed) Unique Word (UW) of $U=U_1+U_2$ (where $U_1$, $U_2$ are non-negative integers) symbols, each $\in \{\pm 1\}$ or all zeros, that repeats itself for any block of M symbols. This implementation may allow the receiver 104 to perform Frequency Domain Equalization (FDE) at the detector, as typically done in OFDM-based receivers while benefiting from the advantages entailed in the STORM process 400, for example, power-efficiency, improved coverage and/or the like.

On the receiver side, similarly to the detection of a STORM signal $S_{STORM}$ 365, a receiver frontend such as the receiver frontend 116 of receiver 104 converts the received signal into an output baseband signal $S_{SC-STORM}$ 420, up to some additional noise and/or distortion) and transfers it to a signal demodulator such as the signal demodulator 118, typically integrated with the processor(s) 120 of the receiver 104. The processor(s) 120 demodulates the received SC-STORM baseband signal to extract the encoded data. Since the main contribution to the power of the SC-STORM output signal $S_{SC-STORM}$ 420 originates from the primary signal $S_1$ 410A (as the power of the primary signal $S_1$ 410A is significantly larger than the power of the auxiliary signal $S_2$ 410B), the processor(s) 120 of the receiver 104 may disregard the contribution of the auxiliary signal $S_2$ 410B and process the received SC-STORM baseband signal as if it were a plain SC signal. The processor(s) 120 of the receiver 104 may use the (non-data-carrying) UW symbols embedded in the transmitted SC-STORM signal $S_{SC-STORM}$ 420 to improve its detection.

In the scenario(s) in which the SC signal is based on the primary sequence $\{a_n\}$ 250A embedded with (copies of) the UW, the SC-STORM signal may be equivalently generated in the frequency domain, using a process implementation similar to the processes 300A, 300B, 300C and/or 300D.

Figure 5:
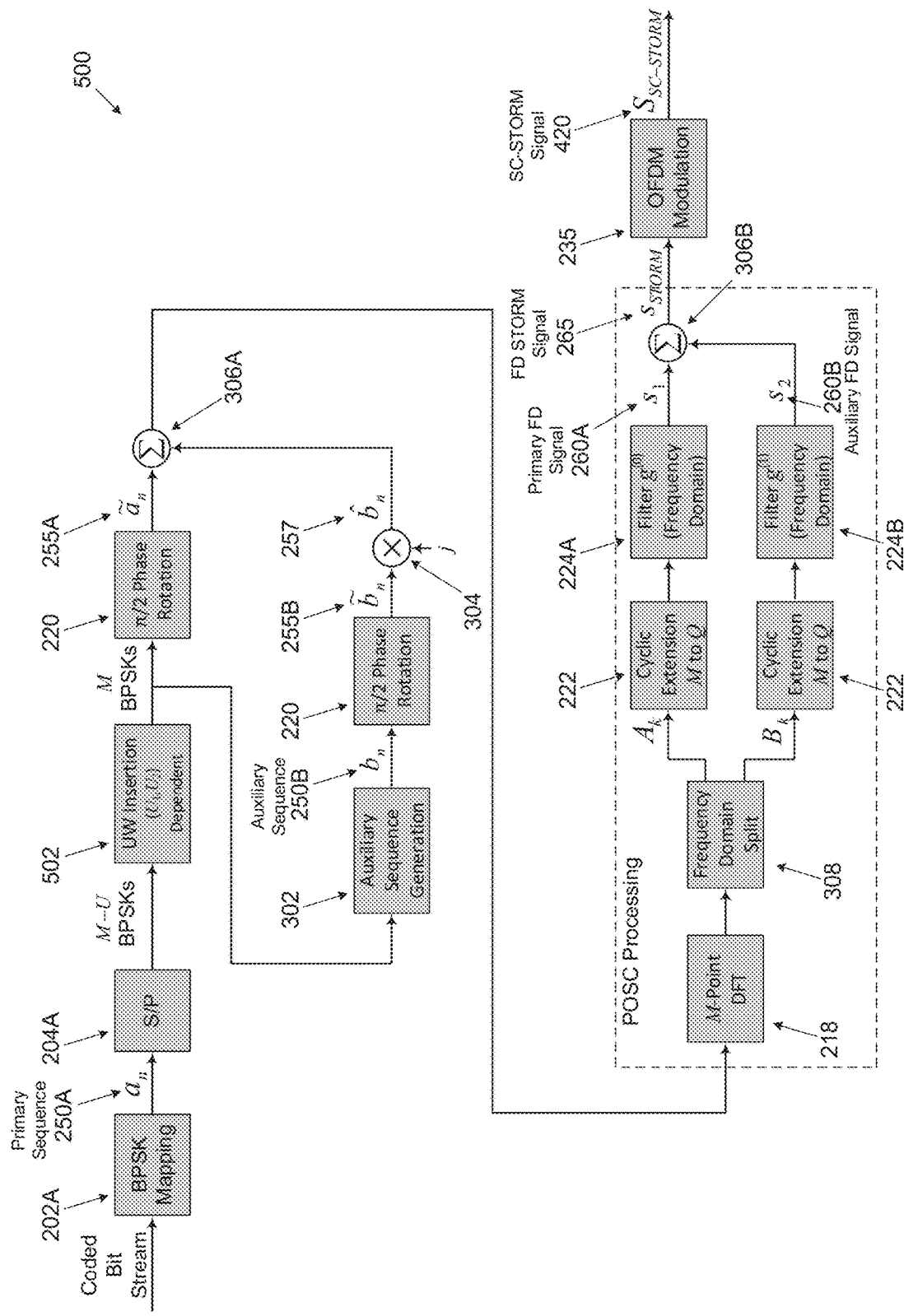
FIG. 5 is a block diagram of an exemplary process for creating an SC-STORM signal via frequency domain processing, according to some embodiments of the present disclosure.

Reference is also made to FIG. 5, which is a block diagram of an exemplary process for creating an SC-STORM signal via frequency domain processing, according to some embodiments of the present disclosure. An exemplary process 500 may be executed by the processor(s) 110 of the transmitter 102 transmitting an output signal to the receiver 104 in the system 100. The process 500 is similar to the process 300D with two main exceptions. First, the processor(s) 110 applies a UW insertion 502 to the primary sequence $\{a_n\}$ 250A. To maintain consistency, an S/P operation 204A applied onto the primary sequence $\{a_n\}$ 250A is assumed to generate sub-sequences (blocks) of M−U symbols. The S/P operation 204A is an adaptation of the S/P operation 204 (applied in the process 300D) which generates sub-sequences of M symbols. The second modification to the process 500 compared to the process 300D relates to adjusting the OFDM modulation 230 to remove the CP insertion 210, resulting in a modified OFDM modulation 235. The processor(s) 110 creates the auxiliary sequence $\{b_n\}$ 250B using the formula expressed in the equation 4 as is done in the process 300D. After performing the first partial join 306C, the processor(s) 110 applies a DFT such as the DFT 118 to the joined sequence. The processor(s) 110 may then split the FD joined sequence by applying the frequency domain split 308 using the formula expressed in the equation 9.

In order to maintain smooth transitions between consecutive modulated blocks, the processor(s) 110 may be adapted to perform the UW insertion 502 by inserting the first $U_2$ symbols of the UW as a postfix to each block of M−U data symbols following the S/P 204A, while inserting the remaining last $U_1$ symbols as a prefix to each block. Furthermore, beyond satisfying $U_1+U_2=U$, both $U_1$ and $U_2$ must be sufficiently larger than L, which is the ISI length in units of $\tilde{T}$ introduced by the FD pulse shaping filters $g^{(i=0,1)}$.

As discussed above for both generation of the STORM output signal $S_{STORM}$ 365 as well as the SC-STORM output signal $S_{SC-STORM}$ 420, selection and/or construction of appropriate pulse shapes $\phi(t)$ and $\varphi(t)$ used to create the primary and the auxiliary POSC signals, respectively, has a crucial impact on the resulting signals with respect to constant amplitude and hence reduced PAPR of the output signals. This means that the FD filters $g^{(0)}$ 224A and $g^{(1)}$ 224B for the SC STORM signals and/or the TD filters 406A and 406B for the SC-STORM signals need to be properly selected.

When constructing the pulse shapes $\phi(t)$ and $\varphi(t)$, for example, in the frequency domain, to be used with the equation 6 (and/or the equation 7), several design criteria may be followed to achieve range extension of the communication system 100, in addition to spectral containment and the near-constant amplitude and hence reduced PAPR for the STORM output signal $S_{STORM}$ 365:

(1) The PAPR of the overall STORM waveform as expressed in the equation 6 (and respectively in the equation 7) should be very small. Formally this may be expressed through equation 13 below.

$$\left( \frac{1}{T+T_g} \int_{-T_g}^{T} dt |s_{STORM}(t)|^2 \right)^{-1} \cdot \max_{-T_g \leq t \leq T} (|s_{STORM}(t)|^2) - 1 \ll 1 \quad \text{Equation 13}$$

(2) The power of the pulse shape $\varphi(t)$ used to create the auxiliary TD POSC signal $S_2$ 360B should be much smaller than the power of the pulse shape $\phi(t)$ used to create the primary TD POSC signal $S_1$ 360A. Formally this may be expressed through equation 14 below.

$$P_{Aux} = \int_{-\infty}^{\infty} dt |\varphi(t)|^2 \ll \int_{-\infty}^{\infty} dt |\phi(t)|^2 = P_{Pri}, \quad \text{Equation 14}$$

$$\text{or (equivalently, in FD)} \sum_{k=0}^{Q-1} |g_k^{(1)}|^2 \ll \sum_{k=0}^{Q-1} |g_k^{(0)}|^2$$

(3) One or more pulse duration constraints (time support) may be applied to the pulse shape $\phi(t)$ and/or the pulse shape $\varphi(t)$ (in units of the basic SC-FDM signaling interval $$\tilde{T} = \frac{T}{M}).$$

For example, the primary pulse duration should be as small as possible, so as to limit the resulting ISI to a manageable detection algorithm (with low complexity) at the receiver 104.

(4) One or more spectral constraints may be applied to the STORM output signal $S_{STORM}$ 365. For example, the Power Spectral Density (PSD) of the STORM output signal $S_{STORM}$ 365 should be sufficiently "narrow", constrained, for example, by a spectral requirement of Spectral Emission Mask (SEM) and/or Adjacent-Carrier Leakage Ratio (ACLR), after passing through a (non-linear) PA such as the PA 114, with as small OBO as possible.

The design criterion (2) may imply that the design criterion (1) and the design criterion (4) are essentially desirable for the primary FD POSC signal $s_1$ 260A by itself, and not only for the overall STORM output signal $S_{STORM}$ 365.

The design criterion (4) implies that in order to efficiently generate the STORM output signal $S_{STORM}$ 365, one or more operational characteristics of the PA 114 must be considered with respect to the spectral constraint(s). Hence the design criterion (4) expresses some degrees of freedom of the STORM concept, making it adaptable to different communication scenarios and applications, as it involves the one or more operational characteristics of the PA 114, represented, for example, through PA modeling as well as specifying regulatory and/or specification-based spectral constraints.

A first exemplary method for constructing the pulse shapes $\phi(t)$ and $\varphi(t)$ in the frequency domain for use in the equation 6 (and/or the equation 7) is based on creating the pulse shapes $\phi(t)$ and $\varphi(t)$ based on some real symmetric ancestor function p(t). The pulse shapes $\phi(t)$ and $\varphi(t)$ may be constructed by the processor(s) 110 of the transmitter 102 using the FD filters $g^{(0)}$ 224A and $g^{(1)}$ 224B, respectively. The range in which the ancestor function p(t) does not vanish, namely the support (denoted supp(p)) of the function p(t), is between $-L\tilde{T}$ and $+L\tilde{T}$, where $$\tilde{T} = \frac{T}{M}$$

and L≥2 is an integer controlling the ISI. Furthermore, the maximum absolute value of the ancestor function p(t) is required to be reached at t=0, and without loss of generality (by virtue of a normalization freedom) the maximum value is set to 1. Namely, the ancestor function p(t) should satisfy the conditions expressed in equation 15 below.

$$\forall t, p(-t)=p(t) \text{ and } |p(t)|\leq p(0)=1;\ p(t)=0 \text{ if } |t|>L\tilde{T}. \quad \text{Equation 15:}$$

To further facilitate fulfillment of one or more of the design criteria (1-4), one or more additional restrictions may be applied. For example, it is preferable to choose an ancestor function p(t) which is continuous and sufficiently smooth within its support, and which satisfies the conditions (a) and (b) in equation 16 below. The restriction(s) 15, 16(a) and 16(b) may be further appended by another condition as expressed in equation 16(c) below to construct particularly nicely-behaved pulse shapes $\phi(t)$ and/or $\varphi(t)$.

Equation 16

$$p\left(\frac{L\tilde{T}}{2}\right) = \frac{1}{\sqrt{2}} \quad (a)$$

$$p(L\tilde{T}) = 0 \quad (b)$$

$$p^2(t) + p^2(L\tilde{T} - t) = 1,\ 0 \leq t \leq L\tilde{T} \quad (c)$$

The pulse shapes $\phi(t)$ and $\varphi(t)$ may be constructed by the processor(s) 110, and/or prepared in advance in some offline process, using the ancestor function p(t) according to the formulas expressed in equation 17 below.

$$\phi(t) = \prod_{m=0}^{L-1} p(t + m\tilde{T}),$$

$$\varphi(t) = p(t) \cdot \left(\prod_{m=2}^{L-1} p(t + m\tilde{T})\right) \cdot p(t + (L+1)\tilde{T})$$

Equation 17

It should be noted that due to the restricted support specified above for the ancestor function p(t), the resulting support in time of the pulse shape functions $\phi(t)$ and $\varphi(t)$ is given by equation 18 below.

$$\text{supp}(\phi) \subseteq (-L\tilde{T}, \tilde{T}),\ \text{supp}(\varphi) \subseteq (-L\tilde{T}, -\tilde{T}) \quad \text{Equation 18:}$$

As is evident from the equation 18, the auxiliary pulse shape $\varphi(t)$ is narrower in time domain (having shorter pulse duration) than the primary pulse shape $\phi(t)$, and therefore the auxiliary filter $g^{(1)}$ 224B is required to be wider in frequency domain than the primary filter $g^{(0)}$ 224A. Furthermore, by virtue of the symmetry (around 0) of the ancestor function p(t), both (intimately coupled) pulse shapes $\phi(t)$ and $\varphi(t)$ are also symmetric, each relative to the center of its own support region (pulse duration), as expressed in equation 19 below.

$$\phi\left(\frac{1-L}{2}\tilde{T} - t\right) = \phi\left(\frac{1-L}{2}\tilde{T} + t\right),$$

$$\varphi\left(-\frac{1+L}{2}\tilde{T} - t\right) = \varphi\left(-\frac{1+L}{2}\tilde{T} + t\right)$$

Equation 19

The ancestor function p(t) may be selected from a plurality of functions. Some exemplary ancestor functions p(t) are provided in equation 20 below, however other functions may be selected as well for representing the ancestor function p(t). The exemplary ancestor functions p(t) are specified in the equation 20 in the range of $0 \leq t \leq L\tilde{T}$, and their values for negative values of t are determined by exploiting the symmetry relation p(-t)=p(t).

$$p_1(t) = 1 - \frac{t}{L\tilde{T}};\ p_2(t) = \left(1 - \frac{t}{L\tilde{T}}\right)^2;$$

$$p_3(t) = \cos\left(\frac{\pi t}{2L\tilde{T}}\right),\ 0 \leq t \leq L\tilde{T}$$

Equation 20

Using, for example, the ancestor function $p_3(t)$ that satisfies the additional restrictions of the equation 16 and setting L=2, the constructed pulse shapes $\phi(t)$ and $\varphi(t)$ are expressed in equation 21 below.

$$\phi(t) = \begin{cases} \cos\left(\frac{\pi t}{4\tilde{T}}\right)\cos\left(\frac{\pi(t+\tilde{T})}{4\tilde{T}}\right) = \\ \frac{1}{2}\cos\left(\frac{\pi}{2\tilde{T}}\left(t + \frac{\tilde{T}}{2}\right)\right) + \frac{1}{2\sqrt{2}} & \text{if } -2\tilde{T} \leq t \leq \tilde{T} \\ 0 & \text{otherwise} \end{cases}$$

Equation 21

-continued $$\varphi(t) = \begin{cases} \cos\left(\frac{\pi t}{4\tilde{T}}\right)\cos\left(\frac{\pi(t+3\tilde{T})}{4\tilde{T}}\right) = \\ \frac{1}{2}\cos\left(\frac{\pi}{2\tilde{T}}\left(t+\frac{3\tilde{T}}{2}\right)\right) - \frac{1}{2\sqrt{2}} & \text{if } -2\tilde{T} \le t < -\tilde{T} \\ 0 & \text{otherwise} \end{cases}$$

Figure 6:
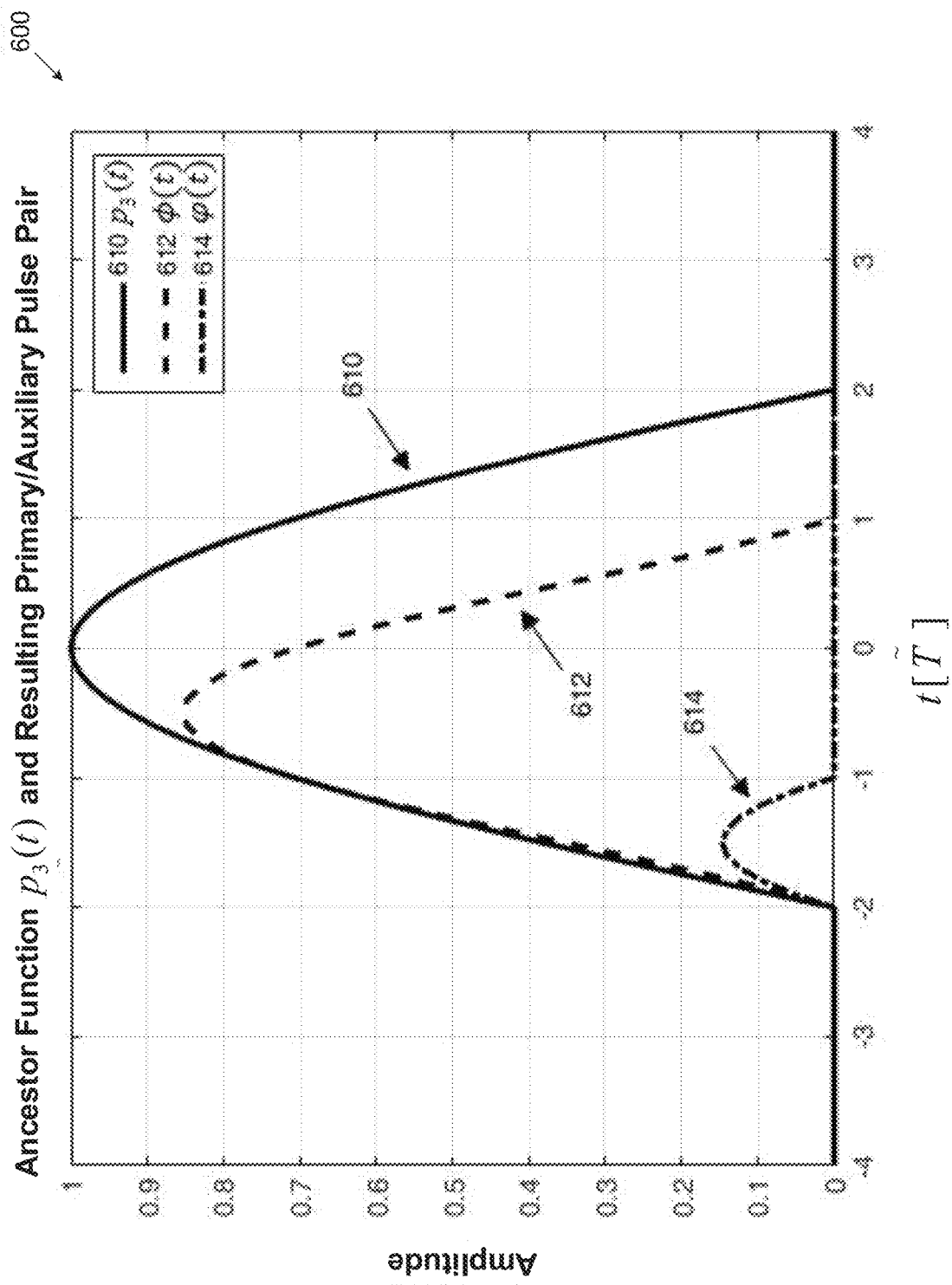
FIG. 6 is a graph of an exemplary ancestor function and resulting pulse functions of time used for constructing pulse shapes used to generate a STORM signal, according to some embodiments of the present disclosure.

Reference is now made to FIG. 6, which is a graph of an exemplary ancestor function used for constructing pulse shapes used to generate a STORM signal, according to some embodiments of the present disclosure. As shown in a graph 600 a primary pulse shape ϕ(t) 612 and an auxiliary pulse shape φ(t) 614 are generated from an ancestor function p(t) 610 such as the ancestor function $p_3(t)$. As evident from the graph 600 the power of the auxiliary pulse shape φ(t) 614 is significantly smaller than the power of the primary pulse shape ϕ(t) 612.

Another exemplary ancestor function p(t) that may be used to generate a STORM output signal such as the STORM output signal $S_{STORM}$ 365, having particularly low PAPR and improved spectral behavior, is presented in equation 22 below.

$$p(t) = \cos\left(\frac{\pi}{2}\int_{-\frac{1}{2}L\tilde{T}}^{t-\frac{1}{2}L\tilde{T}} d\tau\, K\left(\tau; \alpha, \frac{1}{2}L\tilde{T}\right)\right),\, 0 \le t \le L\tilde{T}$$ Equation 22 where $$K(t; \alpha, \beta) = \begin{cases} \dfrac{Q\left(\alpha\left(t-\frac{1}{2}\right)\right) - Q\left(\alpha\left(t+\frac{1}{2}\right)\right)}{N(\alpha, \beta)} & \text{if } -\beta \le t \le \beta \\ 0 & \text{otherwise} \end{cases}$$

$$N(\alpha, \beta) = \int_{-\beta}^{\beta} dt\left[Q\left(\alpha\left(t-\frac{1}{2}\right)\right) - Q\left(\alpha\left(t+\frac{1}{2}\right)\right)\right],$$

$$Q(t) = \int_{t}^{\infty} \frac{dx}{\sqrt{2\pi}} e^{-x^2/2}$$

where α is some positive parameter and the restrictions expressed in the equation 16 are met for any α. Selecting different values for α may lead to different tradeoffs between the desirable properties of the resulting STORM signal, namely different utilizations to realize the design criteria (1-4) for the resulting STORM signal.

A second exemplary method for constructing the pulse shapes ϕ(t) and φ(t) in the frequency domain for use in the equation 6 (and/or the equation 7) is based on deriving the auxiliary pulse shape φ(t) directly from the primary pulse shape ϕ(t), without requiring the ancestor function p(t). The auxiliary pulse shape φ(t) may be constructed by the processor(s) 110 of the transmitter 102, and/or prepared in advance in some offline process, based on a primary pulse shape ϕ(t) whose support satisfies supp(ϕ)⊆(-L$\tilde{T}$,$\tilde{T}$) for some integer L≥2, by using a formula expressed in equation 23 below.

$$\varphi(t) = \begin{cases} \dfrac{\phi(t)\phi(t+2\tilde{T})}{\phi(t+\tilde{T})} & \text{if } \phi(t+\tilde{T}) \ne 0 \\ \lim_{\tau \to t+\tilde{T}} \dfrac{\phi(\tau-\tilde{T})\phi(\tau+\tilde{T})}{\phi(\tau)} & \text{if } -L\tilde{T} < t < -\tilde{T} \text{ and } \\ & \phi(t+\tilde{T}) = 0 \\ 0 & \text{if } t \le -L\tilde{T} \text{ or } t \ge -\tilde{T} \end{cases}$$ Equation 23

The primary pulse shape ϕ(t) may not be completely arbitrary, and must satisfy at least the symmetry constraint $$\phi\left(\frac{1-L}{2}\tilde{T} - t\right) = \phi\left(\frac{1-L}{2}\tilde{T} + t\right).$$

Furthermore, in order to yield a useful STORM output signal $S_{STORM}$ 365, the primary pulse shape ϕ(t) should be continuous and sufficiently smooth, and if it has zeros within its support region, namely there exist discrete values $t_i \in (-L\tilde{T}, \tilde{T})$ s.t. ϕ($t_i$)=0, then the $t_i$ must be arranged $\tilde{T}$ apart from one another and in such a manner that the limit in the equation 23 exists. This implies certain constraints on the derivatives of the primary pulse shape ϕ(t) at the zero(s) $t_i$, and possibly also at the support boundaries. To satisfy the desirable properties summarized by the design criteria (1-4) of the construction of the primary and auxiliary pulse shapes ϕ(t) and φ(t), further judicious selection of the specific form of the primary pulse shape ϕ(t) may be applied. However, such restrictions are not mandatory.

The filter coefficients $\{g_k^{(i)}\}_{k=0}^{Q-1}$ (i=0,1) are determined from the primary and auxiliary pulse shapes ϕ(t) and φ(t) by sampling their Fourier transforms, so that the expression of the equation 5 are satisfied with minimal deviations due to finite numerical accuracy and truncation effects, for example, stemming from the fact that in practice Q is bounded by the IFFT size N.

In order to validate the proposed systems and methods for generating the STORM signals and evaluate the potential benefits and/or advantages of the STORM implementation, some simulation experiments were conducted. The experiments use a modified RAPP PA model, namely the one specified in 11-09-0296-16-00ad-evaluation-methodology (section 3.2, as well as section 2.2.3 in 11-15-0866-02-00ay-11ay-evaluation-methodology), as part of the methodology agreed by the IEEE 802.11 ad/ay task groups for link performance evaluation at 60 GHz. The spectral constraints are based on those agreed by 3GPP for the New Radio (NR) Study Item (cf. the TSG RAN WG1 email discussion "[85-18] PA assumption for NR", June 2016), with simple rescaling adaptation required for the PA model class. LTE OFDM "10 MHz numerology" is assumed, namely that M≤600 where 600 subcarriers occupy 90% of the total system BW.

Figure 7A:
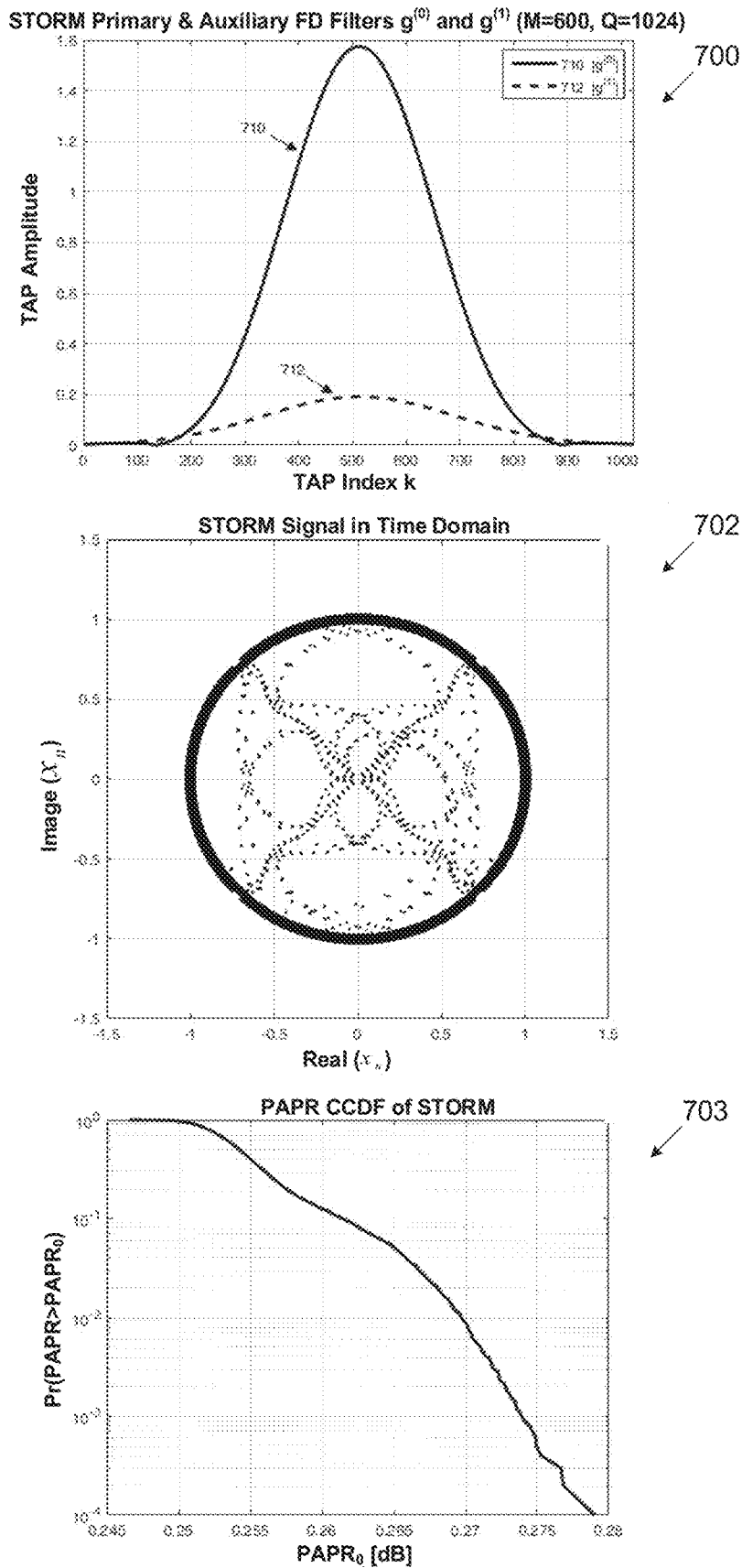
FIG. 7A presents graphs of a spectral representation of a primary and an auxiliary pulse shapes used to create a STORM signal, and a representation of the resulting exemplary STORM signal in the time domain and its PAPR behavior, according to some embodiments of the present disclosure.
Figure 7B:
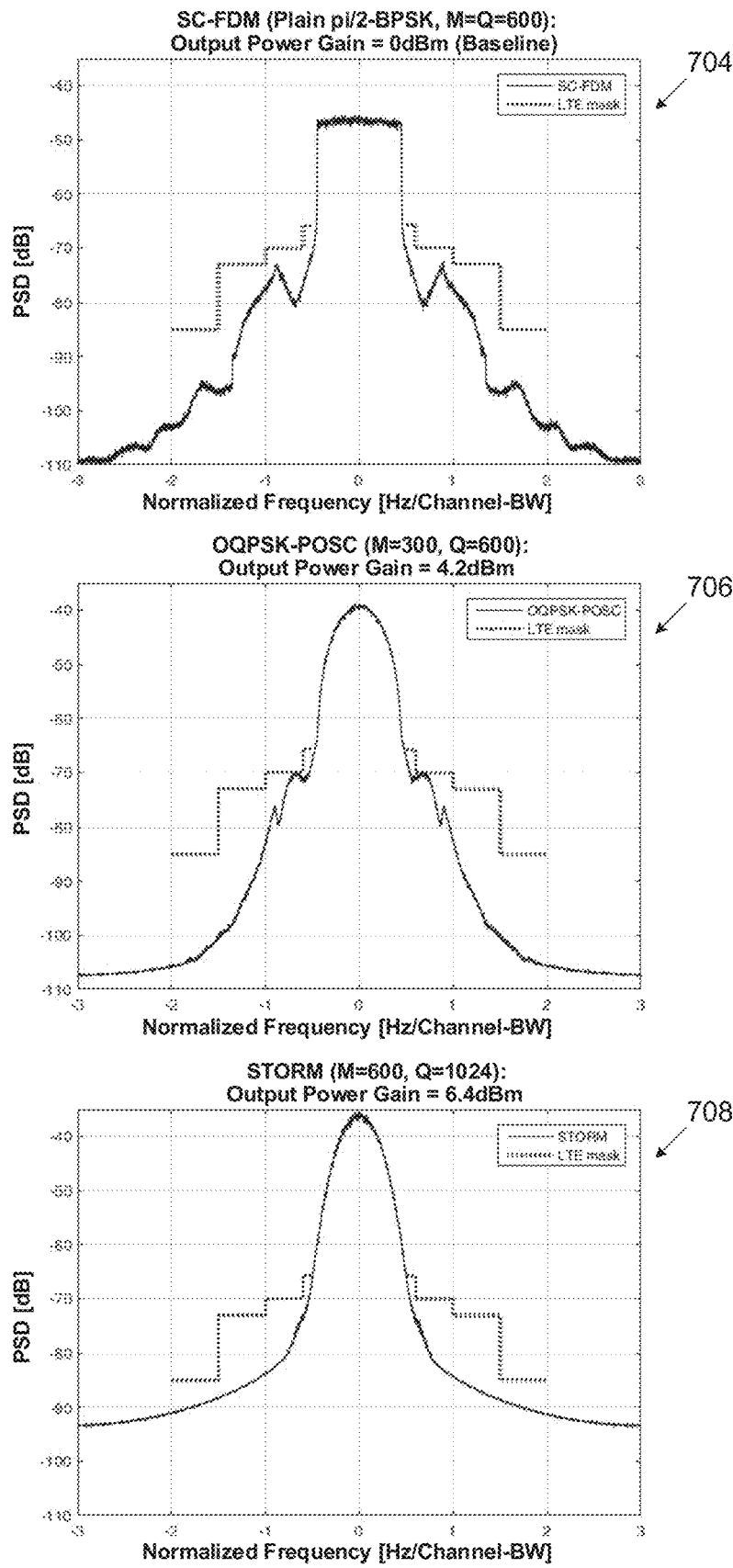
FIG. 7B presents graphs of comparison results of simulations conducted to evaluate the performance of a STORM signal, according to some embodiments of the present disclosure.

Reference is now made to FIG. 7A and FIG. 7B, which are graphs presenting results of validation experiments for validating performance of a STORM signal, according to some embodiments of the present disclosure. FIG. 7A presents graphs of a spectral representation of a primary and an auxiliary pulse shapes used to create a STORM signal used for validation experiments, a representation of the resulting STORM signal in the time domain, and the resulting PAPR performance. FIG. 7B presents graphs of comparison results of experiments conducted to validate performance of a STORM signal, according to some embodiments of the present disclosure. A graph 700 presents the FD filter coefficients (taps) $g_k^{(0)}$ and $g_k^{(1)}$, respectively, where k=0, 1, . . . , Q−1 with Q=1024, of the primary and auxiliary pulse shapes constructed using an ancestor function p(t) such as the ancestor function p(t) expressed in the equation 22 with α=1.5904 and L=10, and a graph 702 presents the distribution in the complex plain of the resulting STORM signal samples in the time domain. As expressed in the graph 700, the power of an auxiliary pulse shape φ(t) 712 is ~17 dB below the power of a primary pulse shape φ(t) 710. As expressed in the graph 702, a STORM signal generated by superposition of the auxiliary pulse shape φ(t) 712 and the primary pulse shape φ(t) 710 exhibits the near-constant modulus property in which the amplitude is near constant for the vast majority of time samples, hence the PAPR may be very small. The dots inside the unit circle in the graph 702 are due to the CP windowing, namely they represent the (relatively few) samples within the tailored boundaries between consecutive OFDM symbols. A graph 703 presents results of a PAPR measurement of the STORM signal, whose time domain behavior is presented in the graph 702, in the form of the Complementary Cumulative Distribution Function (CCDF) of the observed PAPR values over a multitude of time segments of the STORM signal. As shown in graphs 704, 706 and 708 a spectral behavior is compared for three signals driven through the PA model mentioned above. In all three cases, the gain of the signals at the input to a PA such as the PA 114 is tuned to the maximum value possible while making sure the corresponding signals at the output of the PA 114 comply with the spectral constraints. The graph 704 presents the spectral behavior of an SC-FDM baseline signal (generated with M=600 and $$\frac{\pi}{2}$$

BPSK modulation scheme), the graph 706 presents the spectral behavior of an OQPSK-POSC signal (generated with M=300 and QPSK modulation scheme), and the graph 708 presents the spectral behavior of the STORM signal generated using the auxiliary pulse shape φ(t) 712 and the primary pulse shape φ(t) 710. As evident from the graphs 704, 706 and 708, when applying the spectral emission constraint imposed by the LTE spectral emission mask and ACLR requirements, the STORM signal presents a significant output power advantage, namely ~6.4 dB and ~2.2 dB gains relative to SC-FDM and OQPSK-POSC, respectively.

Since in the STORM implementation a special choice of non-Nyquist pulse shaping is used, particularly for the primary pulse shape φ(t), the STORM output signal $S_{STORM}$ 365 may suffer from some (controlled) ISI that may result in some detection loss at a receiver such as the receiver 104. To cope with the ISI (of length ~4 in the evaluated example), the detection performance was evaluated when deploying a low-complexity (8-state, for BPSK) BCJR demodulator, for generating soft bits at the input to a decoder implemented, for example, in processor(s) 120 in the receiver 104. The detection loss at the receiver 104 due to the ISI turned out to be much smaller than the gain in output power (reduced PA OBO). The total gain of the STORM signal in Additive White Gaussian Noise (AWGN) channel, with a receiver 104 that ignores the auxiliary POSC signal ($s_2$ 260B in FD or $S_2$ 360B in TD) is presented in Table 1 below. The table 1 presents a comparison of the three signals—the SC-FDM, the OQPSK-POSC and the STORM signal, where all signals are configured to deliver the same throughput. The detection loss is defined as the offset in the required Rx Signal-to-Noise Ratio (SNR) for maintaining Block Error Rate (BLER) of 10%, using Turbo channel coding as specified in 3GPP TS 36.212 V13.0.0 (2015 December), Evolved Universal Terrestrial Radio Access (E-UTRA); Multiplexing and channel coding (Release 13).

TABLE 1

| Signal | DFT Size M | Turbo Code Rate | Output Power [dBm] | OBO Gain [dB] | Detection Loss | Total Gain [dB] |
|---|---|---|---|---|---|---|
| SC-FDM ($\frac{\pi}{2}$-BPSK) | 600 | $\frac{1}{2}$ | 13.9 | 0 | 0 | 0 |
| OQPSK-POSC with Excess BW 100% | 300 | $\frac{1}{2}$ | 18.1 | 4.2 | 0 | 4.2 |
| SC-FDM-STORM | 600 | $\frac{1}{2}$ | 20.3 | 6.4 | 0.2 | 6.2 |

In a similar performance analysis, for a higher Modulation Coding Scheme (MCS) of BPSK rate ⅔, where the baseline scheme is SC-FDM with $$\frac{\pi}{4}$$

rotated QPSK at code rate ⅓, the total gain for the STORM signal increases from 6.2 dB to 7.4 dB.

According to some embodiments of the present disclosure, the processes 300A, 300B, 300C and/or 300D for generating the STORM output signal $S_{STORM}$ 365 may be extended to join the primary FD POSC signal $s_1$ 260A with a plurality of R auxiliary FD POSC signals $s_{2\_1}$ 260B_1 through $s_{2\_R}$ 260B_R (R≥2). This may allow higher flexibility and/or granularity in complementing the primary FD POSC signal $s_1$ 260A with a plurality of auxiliary FD POSC signals $s_{2\_1}$ 260B_1 through $s_{2\_R}$ 260B_R to further reduce the PAPR of the overall STORM output signal $S_{STORM}$ 365. This implementation may also serve to generate the STORM output signal $S_{STORM}$ 365 for (symbol) constellations (modulation schemes) of order greater than 2, i.e. higher than BPSK. While extending the processes 300A, 300B, 300C and/or 300D may entail cost and/or complexity increase, it may provide the advantages of lower PAPR and/or higher spectral efficiency that may be desired for one or more applications.

Figure 8:
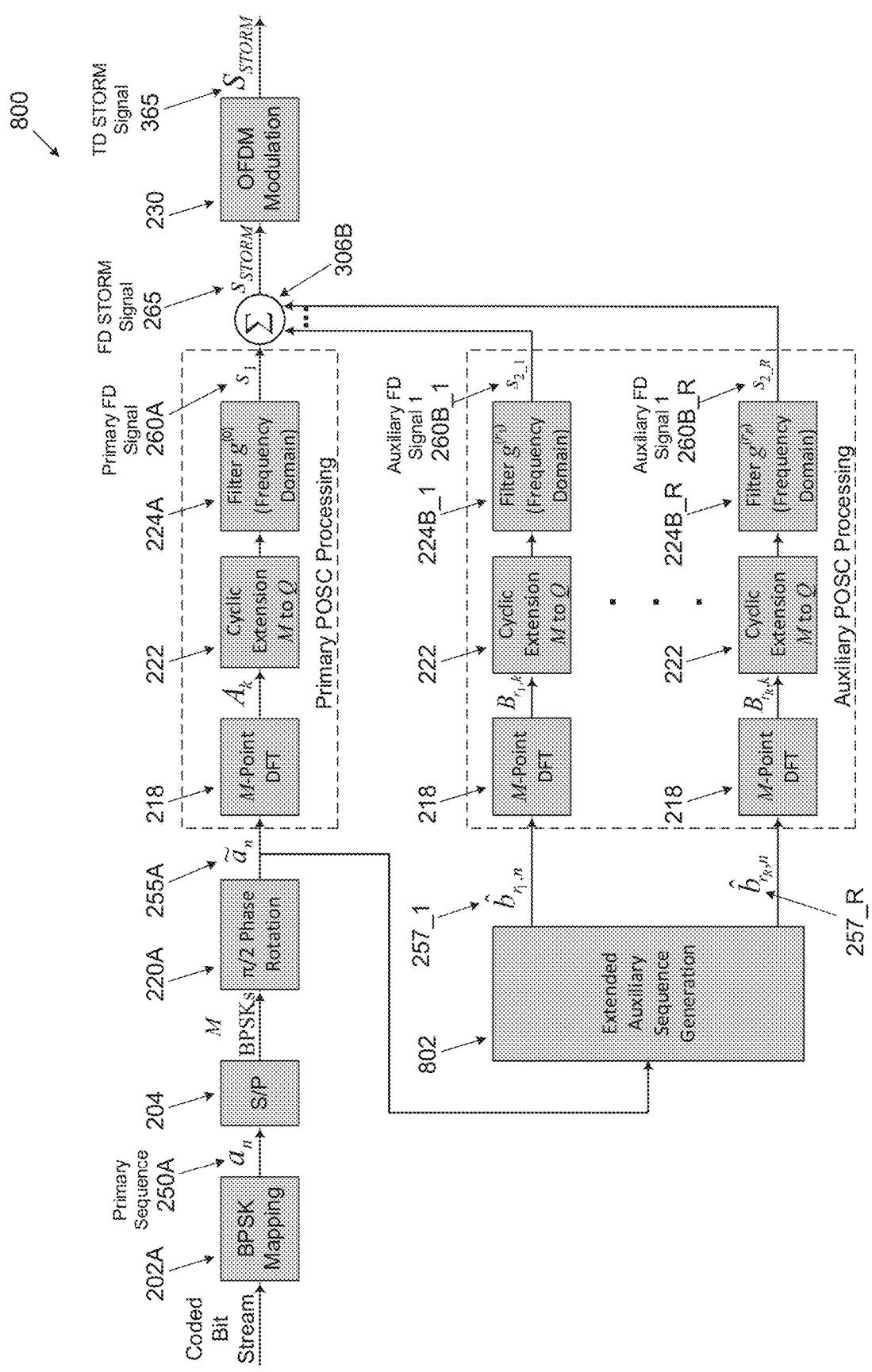
FIG. 8 is a block diagram of an exemplary process for creating a STORM signal with a plurality of auxiliary signals, according to some embodiments of the present disclosure.

Reference is also made to FIG. 8, which is a block diagram of an exemplary process for creating a STORM signal with a plurality of auxiliary signals, according to some embodiments of the present disclosure. An exemplary process 800 may be executed by a processor such as the processor(s) 110 of a processor such as the transmitter 102 transmitting an output signal to a receiver such as the receiver 104 in a system such as the system 100. The process 800 is an extension of the process 300C in which the plurality (R) of auxiliary FD POSC signals $s_{2\_1}$ 260B_1 through $s_{2\_R}$ 260B_R are combined (joined) with the primary FD POSC signal $s_1$ 260A to create the STORM output signal $S_{STORM}$ 365.

As discussed before for the processes 300A, 300B, 300C and/or 300D, while the process 800 may support high order modulation schemes, the exemplary process 800 and supporting mathematical description is provided for BPSK mapping 202A.

The processor(s) 110 may apply an extended auxiliary sequence generation 802 to the phase rotated primary sequence $\{\tilde{a}_n\}$ 255A in order to create a plurality of shifted auxiliary sequences $\{\hat{b}_{r_1,n}\}$ 257_1 through $\{\hat{b}_{r_R,n}\}$ 257_R. The extended auxiliary sequence generation 802 may be an extension of an auxiliary sequence generation operation such as the alternative auxiliary sequence generation operation 302A. The extended auxiliary sequence generation 802 may produce each of the shifted auxiliary sequences $\{\hat{b}_{r_1,n}\}$ 257_1 through $\{\hat{b}_{r_R,n}\}$ 257R depending in a specific manner on the symbols of the rotated primary sequence $\{\tilde{a}_n\}$. The processor(s) 110 may apply the DFT 218 to each of the shifted auxiliary sequences $\{\hat{b}_{r_1,n}\}$ 257_1 through $\{\hat{b}_{r_R,n}\}$ 257_R to create a plurality of FD auxiliary sequences $\{B_{r_1,k}\}$ through $\{B_{r_R,k}\}$, respectively. The processor(s) 110 may apply the cyclic extension 222 to each of the FD auxiliary sequences $\{B_{r_1,k}\}$ through $\{B_{r_R,k}\}$. The processor(s) 110 then may apply a plurality of pulse shapes constructed using a plurality of FD filters $g^{(r_1)}$ 224B_1 through $g^{(r_R)}$ 224B_R to the plurality of FD auxiliary sequences $\{B_{r_1,k}\}$ through $\{B_{r_R,k}\}$ to create a plurality of auxiliary FD POSC signals $s_{2\_1}$ 260B_1 through $s_{2\_R}$ 260B_R, respectively. The processor(s) 110 combines, for example, through summation operation 306B, the primary FD POSC signal $s_1$ 260A with the plurality of auxiliary FD POSC signals $s_{2\_1}$ 260B_1 through $s_{2\_R}$ 260B_R to create the FD STORM output signal $S_{STORM}$ 265, which may then be processed by OFDM modulation 230 to generate the TD STORM output signal $S_{STORM}$ 365 to be transmitted.

The resulting TD STORM output signal $S_{STORM}$ 365 is expressed in equation 24 below.

$$s_{STORM}^{(R)}(t) = \sum_{n=0}^{M-1} \tilde{a}_n \phi(t - n\tilde{T}) + \sum_{i=1}^{R}\sum_{n=0}^{M-1} \hat{b}_{r_i,n} \varphi_{r_i}(t - n\tilde{T}), \quad \text{Equation 24}$$
$$-T_g < t \leq T$$

Here R, restricted by $1 \leq R \leq 2^{L-1}$, is the number of auxiliary FD POSC signals $s_{2\_1}$ 260B_1 through $s_{2\_R}$ 260B_R that are characterized by (generated using) pulse shaping functions $\varphi_{r_i}(t)$, (i=1, 2, ..., R), where $\{r_i\}_{i=1}^R$ are distinct elements of a set $\{(1, 2, ..., 2^{L-1}-1\}$, with L+1 being the smallest integer larger than the duration of the time support (period, duration and/or the like) of the primary pulse shape $\phi(t)$ in units of $$\tilde{T} = \frac{T}{M}.$$

The equation 24 presents the general expression for the TD STORM output signal $S_{STORM}$ 365. As evident, the equation 6 is a special case of the equation 8 in which R=1 and $r_1$=1 (assuming $L \geq 2$).

Each of the shifted auxiliary sequence $\{\hat{b}_{r,n}\}$ 257B may be created by the processor(s) 110 applying the extended auxiliary sequence generation 802 as expressed in equation 25 below, which is a generalization of the equation 8.

$$\hat{b}_{r,n} = \tilde{a}_n \prod_{\substack{m=1 \\ d_{r,m} \neq 0}}^{L-1} \frac{\tilde{a}_{(n-m-1)modM}}{\tilde{a}_{(n-m)modM}}, n = 0, 1, \ldots, M-1 \quad \text{Equation 25}$$

where, for any $r \in \{r_i\}_{i=1}^R \subseteq \{1, 2, \ldots, 2^{L-1}-1\}$, the binary variables $d_{r,m} \subseteq \{0,1\}$ are (uniquely) defined in terms of the binary representation of r as expressed in equation 26 below.

$$r = \sum_{m=1}^{L-1} 2^{m-1} d_{r,m} \quad \text{Equation 26}$$

In an embodiment of the construction of the generalized TD STORM output signal $S_{STORM}$ 365 as expressed in the equation 24, the primary pulse shape $\phi(t)$ and the auxiliary pulse shapes $\varphi_{r_i}(t)$ (i=1, 2, ..., R) are all generated from a single ancestor function p(t) as described in the first exemplary method for constructing the pulse shapes $\phi(t)$ and $\varphi(t)$. The ancestor function p(t) complies with the conditions expressed in the equation 15 and optionally, one or more of the additional restrictions as expressed in the equation 16 (a), (b) and/or (c). The primary pulse shape $\phi(t)$ and the auxiliary pulse shapes $\varphi_{r_i}(t)$ are created according to a generalization of the equation 17 as expressed in equation 27 below.

$$\phi(t) = \prod_{m=0}^{L-1} p(t + m\tilde{T}), \quad \varphi_r(t) = p(t) \cdot \prod_{m=1}^{L-1} p(t + (m + Ld_{r,m})\tilde{T}) \quad \text{Equation 27}$$

In another embodiment of the construction of the generalized TD STORM output signal $S_{STORM}$ 365 as expressed in the equation 24, the auxiliary pulse shapes $\varphi_{r_i}(t)$ (i=1, 2, ..., R) are generated from the primary pulse shape $\phi(t)$ as described in the second exemplary method for constructing the pulse shapes $\phi(t)$ and $\varphi(t)$. The primary shape $\phi(t)$ and the auxiliary pulse shapes $\varphi_{r_i}(t)$ are created according to a generalization of the equation 23 as expressed in equation 28 below.

$$\varphi_r(t) = \qquad\qquad \text{Equation 28}$$

$$\begin{cases} \phi(t) \prod_{\substack{m=1 \\ d_{r,m} \neq 0}}^{L-1} \frac{\phi(t+(m+1)\tilde{T})}{\phi(t+m\tilde{T})} & \text{if} \quad \prod_{\substack{m=1 \\ d_{r,m} \neq 0}}^{L-1} \phi(t+m\tilde{T}) \neq 0 \\[1em] \lim_{\tau \to t} \phi(\tau) \prod_{\substack{m=1 \\ d_{r,m} \neq 0}}^{L-1} \frac{\phi(\tau+(m+1)\tilde{T})}{\phi(\tau+m\tilde{T})} & \text{if} \quad -L\tilde{T} < t < \mu_r \tilde{T} \text{ and} \\[1em] \qquad\qquad \prod_{\substack{m=1 \\ d_{r,m} \neq 0}}^{L-1} \phi(t+m\tilde{T}) = 0 \\[1em] 0 & \text{if} \quad t \leq -L\tilde{T} \text{ or } t \geq -\mu_r \tilde{T} \end{cases}$$

Where $\mu_r = \max_{\substack{1 \leq m \leq L-1 \\ d_{r,m} \neq 0}} m$.

The specific selection of the primary pulse shape $\phi(t)$ and the auxiliary pulse shapes $\varphi_{r_i}(t)$ used for generating the primary FD POSC signal $s_1$ 260A and the auxiliary FD POSC signal $s_{2\_i}$ 260B_i (i=1, 2, . . . , R), including the number R and the associated specific set of indices $\{r_i\}_{i=1}^R$, follows the design principles outlined by the design criteria (1-4). The equation 14 is generalized such that the power of the auxiliary pulse shape $\varphi(t)$ in the equation 14 is replaced by the sum of the plurality of the auxiliary pulse shapes $\varphi r_i(t)$ as expressed in equation 29 below.

$$P_{Aux} = \sum_{i=1}^{R} \int_{-\infty}^{\infty} dt \, |\varphi_{r_i}(t)|^2 \qquad \text{Equation 29}$$

The complexity involved in the inclusion of any additional auxiliary FD POSC signal $s_{2\_i}$ in the design of the TD STORM output signal $S_{STORM}$ 365 (through the index set $\{r_i\}_{i=1}^R$) should be weighed against the spectral advantages (and possibly detection loss degradation) which the multiple auxiliary signal design offers via the further PAPR reduction of the overall STORM output signal $S_{STORM}$ 365. From this perspective, it may be desirable to include in the set of the auxiliary pulse shapes $\varphi_{r_i}(t)$ at least the first member $\varphi_1(t)$ that is the auxiliary pulse shape with widest support in time (pulse duration), namely select $r_1=1$. In general, the auxiliary pulse shapes $\varphi_{r_i}(t)$ with smaller values of $r_i$ are expected to be more dominant, and so their inclusion in the design of the STORM output signal $S_{STORM}$ 365 is more likely to benefit the communication system 100 via coverage extension.

An implementation of the generalized STORM construction with multiple auxiliary signals in frequency domain as in process 800 may require generating the R+1 sets of filter coefficients $\{g_k^{(i)}\}_{k=0}^{Q-1}$, (i=0, 1, . . . , R), to be used by the FD filters $g^{(i)}$ (i=0, 1, . . . , R) (blocks 224A, and 224B_1 through 224_R in the FIG. 8), respectively, satisfying to within some reasonable accuracy the relations expressed in equation 30 below.

$$\phi(t) = \sum_{k=0}^{Q-1} g_k^{(0)} e^{j\frac{2\pi}{T}kt}; \; \varphi_{r_i}(t) = \sum_{k=0}^{Q-1} g_k^{(r_i)} e^{j\frac{2\pi}{T}kt}, \; i = 1, 2, \ldots, R \qquad \text{Equation 30}$$

The process 800 involves R+1 DFT operations 218 (reaching a maximum of $2^{L-1}$ in the extreme case of including all possible $2^{L-1}-1$ auxiliary pulse shapes $\varphi r_i(t)$ in the generation of the STORM output signal $S_{STORM}$ 365. Within the $$R+1 \frac{\pi}{2}$$

-rotated BPSK sequences $\{\tilde{a}_n\}, \{\hat{b}_{r_1,n}\}, \ldots, \{\hat{b}_{r_R,n}\}$ combined via summation 306B by the processor(s) 110 to create the FD STORM output signal $s_{STORM}$ 265, it may be possible to find P pairs (where P satisfies $$\max\left(0, \left\lfloor \frac{R+1-2^{L-1}}{2} \right\rfloor\right) \leq P \leq 2^{L-2}$$

of orthogonal auxiliary sequences, in the sense that the element-wise product of the symbols of the two sequences comprising an orthogonal pair yields a sequence of purely imaginary symbols. Particularly, sequences $\{\tilde{a}_n\}$ 255A and $\{\hat{b}_{1,n}\}$ in process 800 form such a pair, since $\forall n$, Re $(\tilde{a}_n \cdot \hat{b}_{1,n})=0$ as is evident from the equation 8 (and its generalization, the equation 25). Consequently, the process 300D may be generalized for the extended STORM signal, using only P DFT operations 218 per SC-FDM symbol. This complexity-reduction aspect may affect the decision of whether or not to include a certain additional auxiliary FD POSC signal $s_{2\_i}$ in the design if its symbol sequence is orthogonal to that of another unpaired auxiliary FD POSC signal $s_{2\_i}$ which is already included in the set of auxiliary FD POSC signal $s_{2\_i}$, so that the addition would less significantly increase the complexity of the transmitter 102 and thus its inclusion may be considered more favorably.

The straightforward generalization of the above embodiments, extending the STORM methods to include multiple auxiliary signals may also apply to the SC signals construction (in both the time domain and the frequency domain) by extending the expression of the SC-STORM output signal $S_{SC-STORM}$ 420 as expressed in the equation 12 (generated through the process 400 or process 500) to a plurality of auxiliary signals as is described above for the STORM output signal $S_{STORM}$ 365.

Applying the process 800 to generate the $S_{STORM}$ signal and/or the $S_{SC-STORM}$ signal using the plurality of auxiliary signals may be applied to support higher-order constellations (beyond BPSK) for mapping the data stream into the primary sequence $\{a_n\}$. In that case, a BPSK mapping such as the BPSK mapping 202A may be extended into a more general Phase Shift Keying (PSK) mapping, for example, a QPSK mapping, an 8PSK mapping and/or the like. The general PSK mapping may further include mapping the modulation symbols in a differential manner, with (finite-length) memory. Namely, each symbol in the resulting primary sequence $\{a_n\}$ may now depend on more than $\log_2 q$ bits of the input data stream, where q is the constellation size, for example, q=4 for QPSK mapping, q=8 for 8PSK mapping, and so on. Moreover, a complex phase rotation such as the phase rotation 220A may be extended into a more general phase rotation, for example, by a fraction, not necessarily ½, of π.

According to some embodiments of the present disclosure, one or more of the STORM signal generation processes 300A, 300B, 300C, 300D, 400, 500 and/or 800 may be extended to support a multiple PA HF transmitter such as the transmitter 102 comprising a plurality of PAs such as the PA 114, for example, 4 or 8 or 16 PAs 114. In particular, while each of the PAs 114 may be of limited power, the plurality of PAs 114 may be used to simultaneously transmit a respective one of a plurality of partial STORM signals that constitute together the overall STORM signal such that the power of the overall STORM signal is divided among the plurality of PAs 114, each one operating with a relatively small OBO, taking advantage of the respective law-PAPR partial STORM waveform fed into it.

In some embodiments of the multiple PA 114 transmitter 102, the plurality of partial STORM signals may be spatially multiplexed and transmitted by, for example, a HF Multiple Input Multiple Output (MIMO) transmitter 102 comprising the plurality of PAs 114, each providing a separate HF transmission path and each fed with one of the plurality of low-PAPR partial STORM signals. This implementation may be of particularly use in case Analog and/or Digital Beam-Forming (BF), so called Hybrid BF (HBF), is deployed by both the transmitter 102 and a receiver such as the receiver 104 in a system such as the system 100, and where the HF MIMO channel essentially degenerates into a set of nearly disjoint Single Input Multiple Output (SIMO) channels with low delay spreads.

In other embodiments of the multiple PA 114 transmitter 102, the plurality of partial STORM signals may be multiplexed using frequency multiplexing, optionally with some band-width overlap between successive pairs of the plurality of partial STORM signals, where each of the plurality of partial STORM signals is transmitted from a disjoint subset of PAs 114, so as to increase the overall number of SC-FDM subcarriers exploited for the transmission, yet each PA 114 operating with a relatively small OBO by virtue of the law-PAPR partial STORM waveform fed into it.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant FDM and/or SC transmission technologies will be developed and the scope of the terms FDM and/or SC transmission technologies respectively are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. A transmitter, comprising:
a processor adapted to:
convert a primary sequence of modulation symbols into a primary signal in the frequency domain, using a primary pulse shape;
convert an auxiliary sequence of modulation symbols, created from the primary sequence, to an auxiliary signal in the frequency domain using an auxiliary pulse shape; and
create, based on the primary signal and the auxiliary signal, a joint output signal for transmission to a receiver in the time domain.

2. The transmitter of claim 1, wherein the processor is configured to perform at least one of the following operations on the primary sequence, or on the auxiliary sequence, or on a compounded sequence thereof:
when the processing is in a frequency domain:
a complex phase shift by $\pi/2$ or a multiple thereof;
a discrete Fourier transformation, DFT;
a cyclic extension;
a filter process with information about the primary pulse shape for the primary sequence and/or about the auxiliary pulse shape for the auxiliary sequence; and
when the processing is in a time domain:
an up-sampling;
a filter process with information about the primary pulse shape for the primary sequence and/or about the auxiliary pulse shape for the auxiliary sequence.

3. The transmitter of claim 1, wherein the auxiliary sequence is created from the primary sequence by generating each modulation symbol of the auxiliary sequence from a corresponding modulation symbol of the primary sequence and at least two preceding modulation symbols of the primary sequence.

4. The transmitter of claim 3, further comprising cyclically extending a plurality of finite sub-sequences of consecutive symbols of the primary sequence to create a plurality of respective finite sub-sequences of consecutive symbols of the auxiliary sequence.

5. The transmitter of claim 1, wherein the processor is adapted for transmission of the joint output signal using any one of a group:
frequency division multiplexing, FDM;
discrete-Fourier-transform spread orthogonal FDM, DFT-s-OFDM;
single carrier FDM, SC-FDM;
and/or a transmission based on frequency division multiple access (FDMA).

6. The transmitter of claim 1, wherein the processor is adapted to periodically insert at least one fixed finite sequence of symbols, including a unique word, UW, into the primary sequence.

7. The transmitter of claim 1, wherein the processor is adapted to periodically insert guard intervals into the joint output signal transmitted in the time domain, wherein the guard intervals include at least one member of:
a cyclic prefix, CP;
a cyclic postfix;
a zero prefix, ZP;
and a zero tail, ZT.

8. The transmitter of claim 1, wherein the primary sequence modulation symbols map a data stream according to a Binary-Phase Shift Keying, BPSK, modulation scheme.

9. The transmitter of claim 1, wherein the sequence of modulation symbols of the primary sequence maps a data stream according to a higher order Phase Shift Keying, PSK, modulation scheme using a finite-memory differential mapping scheme, and the primary sequence and the auxiliary sequence further undergoing complex phase rotation between consecutive symbols by a fraction of $\pi$.

10. The transmitter of claim 1, wherein a Peak to Average Power Ratio, PAPR, of the joint output signal is lower than the PAPR of the primary signal.

11. The transmitter of claim 1, wherein a power of the auxiliary pulse shape used for converting the auxiliary signal is smaller than a power of the primary pulse shape used for converting the primary signal by at least 10 dB such that the power of the auxiliary signal is negligible with respect to the power of the primary signal.

12. The transmitter of claim 1, wherein the primary pulse shape and the auxiliary pulse shape comply with at least one of a plurality of pulse duration constraints.

13. The transmitter of claim 1, wherein the processor is adapted to create the joint output signal to comply with at least one of a plurality of signal spectral constraints.

14. The transmitter of claim 1, wherein the primary pulse shape and the auxiliary pulse shape are constructed using an ancestor function.

15. The transmitter of claim 1, wherein the auxiliary pulse shape is based on the primary pulse shape.

16. The transmitter of claim 1, wherein the processor is adapted to perform a superposition in the frequency domain after separately converting the primary sequence and the auxiliary sequence into the frequency domain.

17. The transmitter of claim 1, wherein the processor is adapted to join the primary signal and the auxiliary signal through a first partial join in the time domain of the respective primary and auxiliary sequences and a second partial join in the frequency domain.

18. The transmitter of claim 1, wherein the joint output signal is transmitted simultaneously as a plurality of partial output signals through a plurality of power amplifiers to support a multi input multi output, MIMO, transmission.

19. The transmitter of claim 1, wherein the joint output signal is transmitted simultaneously as a plurality of partial output signals through a plurality of power amplifiers divided to a plurality of subsets.

20. The transmitter of claim 1, wherein the processor is adapted to create at least one demodulation reference signal similarly to the joint output signal.

21. A receiver, comprising a receiver frontend and a processor, wherein:
the receiver frontend is adapted to convert a synthesis of a near-constant modulus (STORM) signal received in the time domain from a transmitter into a STORM output baseband signal ($S_{STORM}$) as an input signal to the processor; and
the processor is adapted to demodulate the input signal received from the transmitter, the STORM signal having been created as a joint output signal for time domain transmission to the receiver based on a combination of a frequency domain primary signal and a frequency domain auxiliary signal, the primary signal and the auxiliary signal having been created by converting a primary sequence of modulation symbols into the primary signal using a primary pulse shape and an auxiliary sequence of modulation symbols into the auxiliary signal using an auxiliary pulse shape, respectively.

22. The receiver of claim 21, wherein the processor is adapted to disregard the auxiliary signal when demodulating the input signal.

23. The receiver of claim 21, wherein the processor is adapted to use at least one demodulation reference signal to demodulate the input signal.

24. A non-transitory computer-readable storage medium storing a computer program which, when executed by a processor of a transmitter, causes the processor to:
- convert a primary sequence of modulation symbols into a primary signal in the frequency domain, using a primary pulse shape;
- convert an auxiliary sequence of modulation symbols, created from the primary sequence, to an auxiliary signal in the frequency domain using an auxiliary pulse shape; and
- create, based on the primary signal and the auxiliary signal, a joint output signal for transmission to a receiver in the time domain.

\* \* \* \* \*